US010712063B2

(12) United States Patent
Cobabe et al.

(10) Patent No.: US 10,712,063 B2
(45) Date of Patent: Jul. 14, 2020

(54) FROZEN PRODUCT DISPENSING SYSTEMS AND METHODS

(71) Applicant: FBD PARTNERSHIP, LP, San Antonio, TX (US)

(72) Inventors: R. Craig Cobabe, Boerne, TX (US); Stephen K. Versteeg, San Antonio, TX (US)

(73) Assignee: FBD PARTNERSHIP, LP, San Antonio, TX (US)

( * ) Notice: Subject to any disclaimer, the term of this patent is extended or adjusted under 35 U.S.C. 154(b) by 336 days.

(21) Appl. No.: 15/785,614

(22) Filed: Oct. 17, 2017

(65) Prior Publication Data

US 2018/0106515 A1    Apr. 19, 2018

Related U.S. Application Data

(60) Provisional application No. 62/409,233, filed on Oct. 17, 2016.

(51) Int. Cl.
*F25B 41/06* (2006.01)
*A23G 9/22* (2006.01)
*A23G 9/28* (2006.01)
*A23G 9/00* (2006.01)

(52) U.S. Cl.
CPC .............. *F25B 41/062* (2013.01); *A23G 9/00* (2013.01); *A23G 9/22* (2013.01); *A23G 9/224* (2013.01); *A23G 9/228* (2013.01); *A23G 9/28* (2013.01); *A23G 9/281* (2013.01); *F25B 2600/01* (2013.01); *F25B 2600/2513* (2013.01); *F25B 2700/21* (2013.01)

(58) Field of Classification Search
CPC ................ F25B 41/062; F25B 2600/01; F25B 2600/2513; F25B 2600/23; F25B 2700/21; F25B 2700/21175
USPC .......................................... 62/158, 222–225
See application file for complete search history.

(56) References Cited

U.S. PATENT DOCUMENTS

| 2,236,620 A | 4/1941 | Cornelius |
| 2,276,811 A | 3/1942 | Ward |
| 2,562,638 A | 7/1951 | Philipp |
| 2,610,478 A | 9/1952 | Lofstedt |
| 2,735,276 A | 2/1956 | Thompson |
| 3,030,976 A | 4/1962 | Brown |
| 3,280,459 A | 10/1966 | Walker |
| 3,460,717 A | 8/1969 | Thomas |
| 3,468,137 A | 9/1969 | Welty |
| 3,517,524 A | 6/1970 | Fielder |
| 3,661,303 A | 5/1972 | Prosenbauer |
| 3,677,272 A | 7/1972 | Shrank |
| 3,823,571 A | 7/1974 | Smith et al. |
| 4,213,795 A | 7/1980 | Ernstsson |
| 4,590,970 A | 5/1986 | Mott |
| 4,736,600 A | 4/1988 | Brown |
| 4,754,609 A | 7/1988 | Black |
| 4,784,697 A | 11/1988 | Bordini |

(Continued)

*Primary Examiner* — Devon Russell
(74) *Attorney, Agent, or Firm* — McAughan Deaver PLLC

(57) ABSTRACT

An improved frozen product dispenser wherein a product is placed into a cooled hopper and the product is then fed from the hopper into a freezing and dispensing chamber where it is frozen and dispensed. Applicants have further created improved methods and apparatuses for to control the refrigeration and freezing systems of the exemplary frozen product machines are disclosed herein.

19 Claims, 15 Drawing Sheets

(56) References Cited

U.S. PATENT DOCUMENTS

| | | |
|---|---|---|
| 5,209,076 A | 5/1993 | Kauffman |
| 5,270,013 A | 12/1993 | Decker |
| 5,388,925 A | 2/1995 | Wilcox |
| 5,410,888 A | 5/1995 | Kaiser |
| 5,415,326 A | 5/1995 | Durham |
| 5,553,756 A | 9/1996 | Topper |
| 5,632,411 A | 5/1997 | Harty |
| 5,706,661 A | 1/1998 | Frank |
| 5,740,844 A | 4/1998 | Miller |
| 5,743,097 A | 4/1998 | Frank |
| 5,799,726 A | 9/1998 | Frank |
| 5,806,550 A | 9/1998 | Frank |
| 5,899,077 A | 5/1999 | Wright |
| 5,974,824 A | 11/1999 | Galockin |
| 6,161,558 A | 12/2000 | Franks |
| 6,189,745 B1 | 2/2001 | Frank |
| 6,223,948 B1 | 5/2001 | Davis |
| 6,513,578 B2 | 2/2003 | Frank |
| 6,536,224 B2 | 3/2003 | Frank et al. |
| 6,625,993 B2 | 9/2003 | Frank et al. |
| 6,637,214 B1 | 10/2003 | Leitzke |
| 6,679,314 B2 | 1/2004 | Frank |
| 6,877,635 B2 | 4/2005 | Stratton |
| 7,562,793 B2 | 7/2009 | Ufheil |
| 8,079,230 B2 | 12/2011 | Frank |
| 8,375,734 B2 * | 2/2013 | Hall ............... F25B 41/062 62/225 |
| 8,528,786 B2 | 9/2013 | Gates |
| 8,701,435 B2 | 4/2014 | Gist et al. |
| 8,701,939 B2 | 4/2014 | Frank |
| 8,875,732 B2 | 11/2014 | Cloud |
| 8,960,500 B2 | 2/2015 | Van Opstal |
| 9,173,521 B2 | 11/2015 | Gates |
| 9,388,033 B2 | 7/2016 | Gates |
| 9,457,386 B2 | 10/2016 | Gates |
| 10,034,488 B2 | 7/2018 | Graczyk |
| 10,321,699 B2 | 6/2019 | Gates |
| 10,327,455 B2 | 6/2019 | Gates |
| 2001/0035016 A1 | 11/2001 | Weber et al. |
| 2002/0033021 A1 | 3/2002 | Frank |
| 2002/0043071 A1 | 4/2002 | Frank |
| 2002/0108964 A1 | 8/2002 | Staten |
| 2003/0037553 A1 | 2/2003 | Sulc |
| 2003/0126871 A1 | 7/2003 | Frank |
| 2003/0150227 A1 | 8/2003 | Ross |
| 2004/0124548 A1 | 7/2004 | Rona |
| 2005/0132733 A1 * | 6/2005 | Rafalovich ............ F25D 29/00 62/199 |
| 2006/0054614 A1 | 3/2006 | Baxter |
| 2006/0186137 A1 | 8/2006 | Till |
| 2006/0277932 A1 | 12/2006 | Otake |
| 2007/0017234 A1 | 1/2007 | Moulder |
| 2007/0062212 A1 | 3/2007 | Frank |
| 2007/0125104 A1 | 6/2007 | Ehlers |
| 2007/0251260 A1 | 11/2007 | Baxter |
| 2008/0006050 A1 | 1/2008 | Gist |
| 2008/0073609 A1 | 3/2008 | Akkermann |
| 2008/0202130 A1 | 8/2008 | Kadyk |
| 2008/0203113 A1 | 8/2008 | Groh |
| 2008/0254180 A1 | 10/2008 | Windhab |
| 2008/0289357 A1 | 11/2008 | Skobel |
| 2008/0302824 A1 | 12/2008 | Blomme |
| 2009/0000315 A1 | 1/2009 | Billman |
| 2009/0014464 A1 | 1/2009 | Adbelmoteleb |
| 2009/0151377 A1 | 6/2009 | Yonemori |
| 2009/0211269 A1 | 8/2009 | Gist |
| 2009/0292395 A1 | 11/2009 | DiFatta |
| 2010/0000244 A1 * | 1/2010 | Kawakatsu ........... F25B 41/062 62/210 |
| 2010/0044395 A1 | 2/2010 | Webb |
| 2010/0180630 A1 | 7/2010 | Ogawa |
| 2010/0293965 A1 | 11/2010 | Frank et al. |
| 2010/0319389 A1 | 12/2010 | Yang et al. |
| 2011/0042414 A1 | 2/2011 | Tachibana |
| 2011/0049190 A1 | 3/2011 | Sevcik |
| 2011/0192423 A1 | 8/2011 | Boussemart |
| 2011/0298184 A1 | 12/2011 | Aurelius |
| 2012/0181287 A1 | 7/2012 | Holbeche |
| 2012/0186202 A1 | 7/2012 | Pandurangan |
| 2013/0086930 A1 | 4/2013 | Scherer |
| 2013/0140328 A1 | 6/2013 | Gates |
| 2013/0180594 A1 | 7/2013 | Schneider |
| 2013/0200103 A1 | 8/2013 | Gates |
| 2014/0061345 A1 | 3/2014 | Machovina |
| 2014/0209635 A1 | 7/2014 | Gates |
| 2016/0089702 A1 | 3/2016 | Gates et al. |
| 2016/0229675 A1 | 8/2016 | Popov |
| 2016/0245564 A1 | 8/2016 | Frank et al. |
| 2016/0245573 A1 | 8/2016 | Frank |
| 2017/0027185 A1 | 2/2017 | Acosta |
| 2017/0027188 A1 | 2/2017 | Raybin |
| 2017/0030467 A1 | 2/2017 | Versteeg |
| 2017/0064977 A1 | 3/2017 | Bischel |
| 2017/0225936 A1 | 8/2017 | Jersey |
| 2018/0103656 A1 | 4/2018 | Acosta |
| 2018/0106515 A1 | 4/2018 | Cobabe |

* cited by examiner

*ROC: Rate of Change

FROZEN PRODUCT DISPENSING SYSTEMS AND METHODS

CROSS REFERENCE TO RELATED APPLICATIONS

This application claims priority to U.S. Provisional patent application Ser. No. 62/409,233, filed Oct. 17, 2016, the contents of which are incorporated by reference herein in their entirety.

STATEMENT REGARDING FEDERALLY SPONSORED RESEARCH/DEVELOPMENT

Not applicable.

REFERENCE TO APPENDIX

Not applicable.

BACKGROUND OF THE INVENTION

The subject matter of this disclosure relates to improved frozen product dispenser systems and methods wherein a product is placed into a cooled hopper and the product is then fed from the hopper into a freezing and dispensing chamber where it is frozen and dispensed. More specifically, the subject matter of this disclosure is related to improved systems and methods of controlling the refrigeration and freezing of product of a frozen product dispenser.

Frozen product dispensers, generally, have been known in the art and have been used to freeze and dispense a variety of products including, but not limited to food products such as beverages, ice cream, yogurt, and other food items. Such prior art dispensers have suffered from various shortcomings and/or limitations.

The temperature and viscosity of the ingredients within the mixing chamber may be maintained by a control system that controls the refrigeration system. A method for controlling a frozen beverage machine's barrel refreeze cycle is based on the beater motor's torque (or power consumption). When the measured torque on the beater motor drops below a specified threshold, the machine initiates a freeze cycle and chills the barrel until the torque on the motor reaches a higher specified torque. While this is an indicator of the quality of the frozen product, other sensors throughout the dispensing device may be used to ensure that all of the functions work properly and that the motor torque reading is not providing an erroneous value.

In normal operation, a mix of ingredients are poured into a hopper, and some portion of that mix is allowed to flow downward into the freezing chamber. A motor outside of the freezing chamber drives a beater, which mixes the mix with air. Simultaneously a refrigeration unit chills the mix in the freezing barrel rapidly cooling it to the desired temperature.

Over time, the freezing barrel will lose heat through entropy and the freezing cycle will need to be repeated. Also, product will be dispensed and new mix added which will be at a temperature higher than the product in the freezing chamber. Since the goal of a frozen food dispenser is to provide uniform and quality product, the freezing cycle must be carefully regulated to ensure that the product does not deviate too far from optimal conditions.

To address this goal of providing consistent and quality product, several processes are loaded into the controller of the dispensing unit, and in fact, multiple controllers may be designed into the unit to guard against the failure of the primary controller. The controller may be a PID (proportional-integral-derivative) controller, a microprocessor, or similar electronic control apparatus. The main control process will bring the mix to a desired product using all sensors available to it under normal circumstances. While the units are built with the highest achievable quality standards, components such as sensors are known to fail, or to be jarred loose from their designed positions resulting in erroneous readings being fed into the control processor. Since relying upon those erroneous readings may provide undesirable product, the readings received by the control processor are checked against expected norms. If a sensor is providing readings that are outside of expected norms, the controller may distrust the reading and implement an alternate control program in an attempt to continue to provide desirable product. In creating the programming for the controllers, two objectives come to the forefront: (i) ensure that the tolerances around the expected sensor readings are not too wide to accept skewed readings but yet not too tight to reject correct readings and (ii) implement alternative control programs that will continue to provide quality product ready for dispensing even under rather adverse conditions resulting from the loss of inputs and feedbacks.

Under adverse conditions, the logic that will be used in exemplary dispensing systems must rely upon input and feedback from components that normally do not provide the primary inputs for the process. As such, the logic must be flexible and anticipate conditions that may prevent it from providing a quality food product.

One of several objects of the teachings of this disclosure is to resolve or reduce the identified—and other—shortcomings and/or limitations in prior art frozen product dispensers.

BRIEF SUMMARY OF SELECT ASPECTS OF THE INVENTION

None of these brief summaries of the aspects invention is intended to limit or otherwise affect the scope of the appended claims, and nothing stated in this Brief Summary of the Invention is intended as a definition of a claim term or phrase or as a disavowal or disclaimer of claim scope.

In one of many summaries of the inventions disclosed herein is a refrigeration device comprising: (a) a freezing chamber for freezing a product; (b) an evaporator for cooling the freezing chamber to a temperature sufficient to permit freezing of the product; (c) an expansion valve coupled to the evaporator for regulating the flow of refrigerant through the evaporator; (d) a sensor for sensing the temperature of the of the refrigerant flowing through the expansion valve and generating a sensed temperature signal corresponding to the sensed temperature; (e) a memory structure including a first set of data defining a first range of predetermined temperature values and a second set of data defining a second range of predetermined temperature values wherein the first range of sensor values is broader than and includes the second range of sensor values; (f) a controller that receives the sensed temperature signal from the sensor and controls the operation of the expansion valve to control the flow of refrigerant through the evaporator to cool the freezing chamber; and (g) wherein, during a first time interval, the controller: (i) controls the operation of the expansion valve at least in part in response to the sensed temperature signal if the sensed temperature signal is within the first range of predetermined temperature values; and (ii) considers as inaccurate any sensed temperature signal outside the first range; and (h) wherein, during a second time interval, the controller: (i) controls the operation of the expansion valve at least in part in response to the sensed temperature signal if the sensed temperature signal is within the second range of predetermined temperature values; and (ii) considers as inaccurate any sensed temperature signal outside the second range.

Yet another summary of the inventions disclosed herein is a refrigeration device having: a mixing chamber that produces a product, an evaporator, an expansion valve coupled to the evaporator for regulating the flow of refrigerant through the evaporator, a temperature sensor for providing a value representative of the return temperature of the refrigerant, and a controller that receives the value from the temperature sensor and regulates the duty cycle of the valve to control the cooling of the mixing chamber, a method comprising the steps of: (a) initiating operation of the control valve by the controller to cool the mixing chamber at a first point in time; (b) for a first time interval following the initiation of the operation of the control valve, considering for control purposes values received from the temperature sensor that are within a first range of values and deeming inaccurate, and not considering for control purposes values received from the return refrigerant temperature sensor that are outside the first range of values; (c) for a second time interval following the conclusion of the first time interval, deeming inaccurate and not considering for control purposes values received from the return refrigerant temperature sensor that are outside a second range of values, wherein the second range of values is a subset of the first range of values.

The following examples are included to demonstrate preferred embodiments of the inventions. It should be appreciated by those of skill in the art that the techniques disclosed in the examples, which follow represent techniques discovered by the inventors to function well in the practice of the inventions, and thus can be considered to constitute preferred modes for its practice. However, those of skill in the art should, in light of the present disclosure, appreciate that many changes can be made in the specific embodiments which are disclosed and still obtain a like or similar result without departing from the scope of the inventions.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1A:
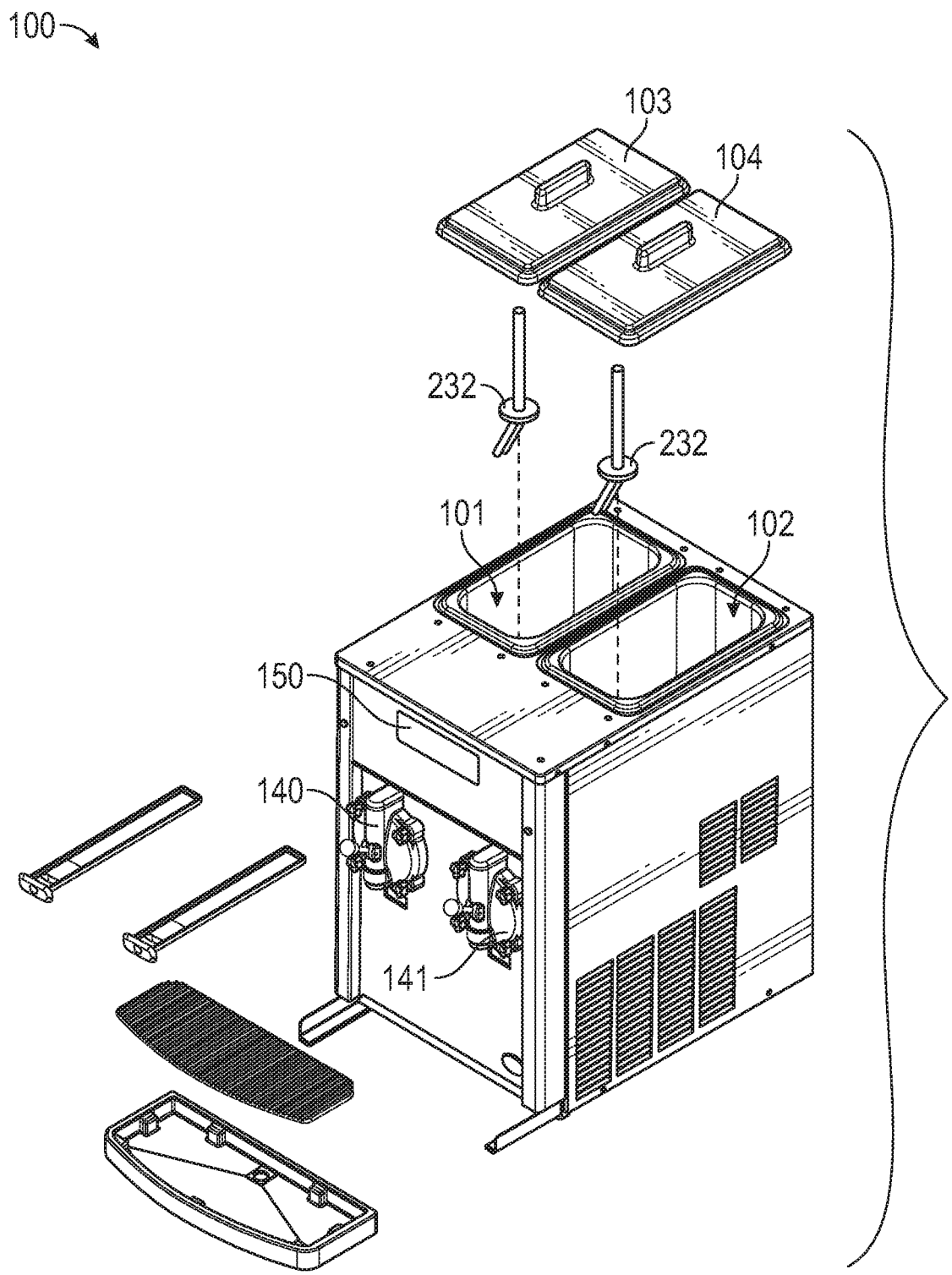
FIGS. 1A-1C illustrate at a high level an exemplary frozen product dispenser constructed in accordance with certain teachings set forth herein.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing systems. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

Figure 1B:
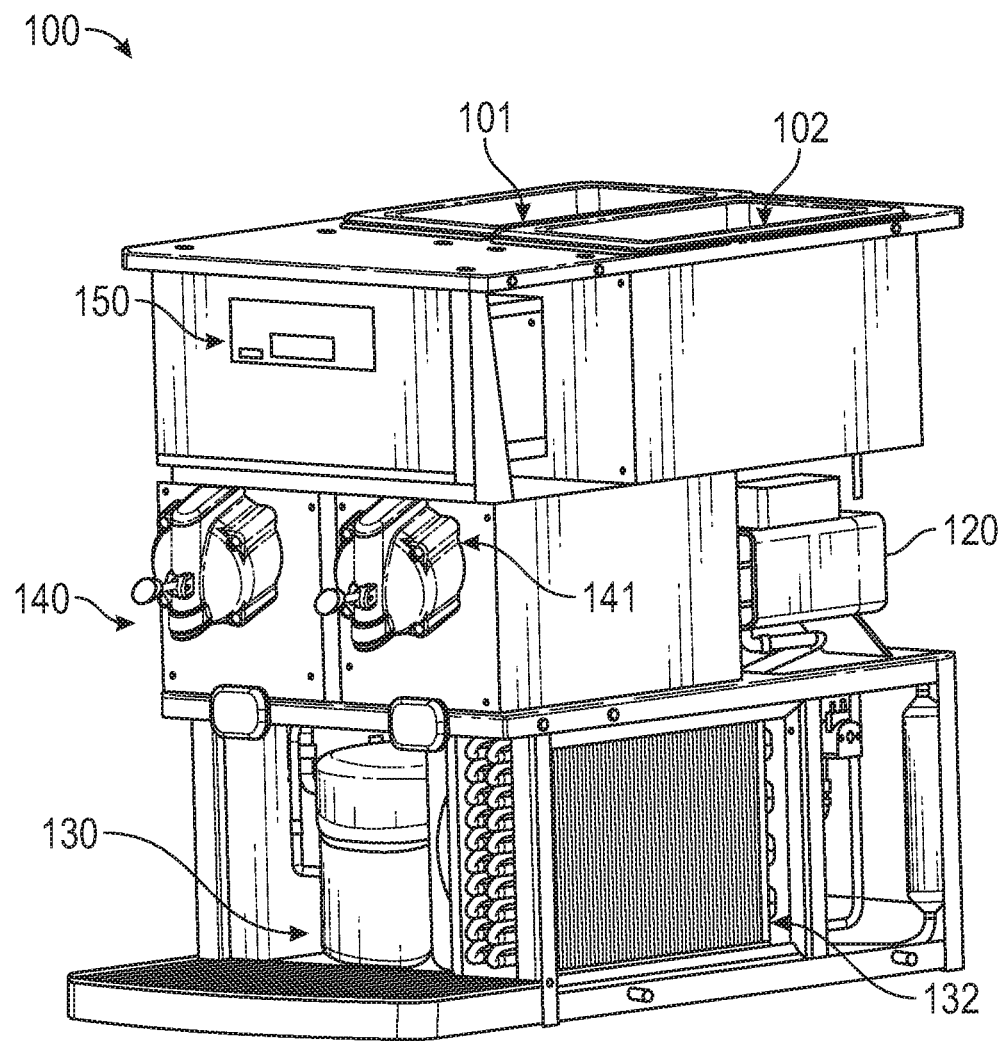
Figure 1C:
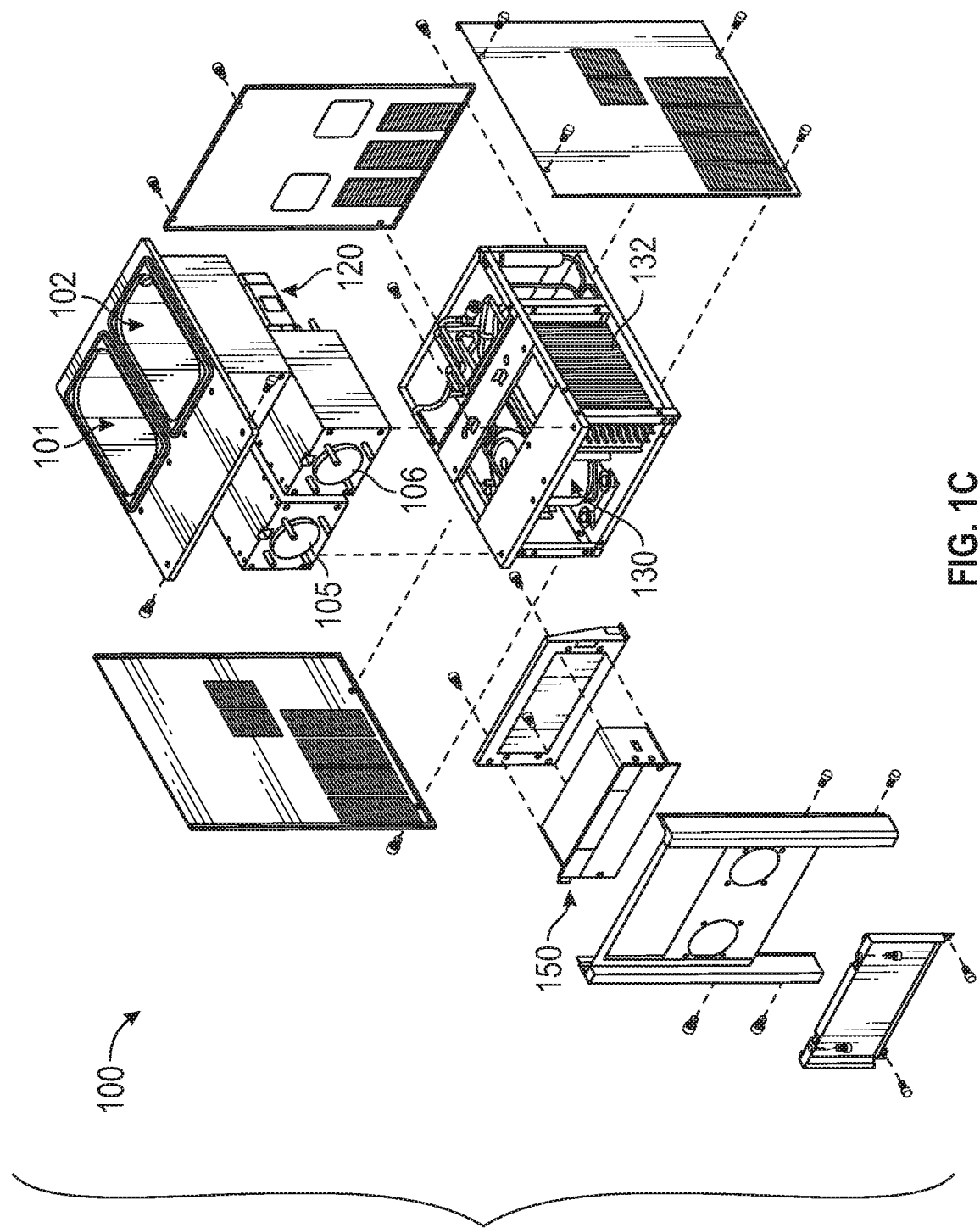

Turning to the drawings and, in particular, to FIGS. 1A, 1B, and 1C aspects of an exemplary frozen product dispenser 100 are illustrated. For purposes of the following discussion, the product to be dispensed by the frozen product dispenser 100 will be described in the context of a dairy-based food product, such as a soft serve ice cream product, smoothies, milk shakes, or a frozen yogurt product. It should be understood, however that—unless explicitly so indicated—the teachings, disclosure and recitation of claimed subject matter set forth herein is not limited to food products generally, or to dairy-based food products specifically, and that the teachings and disclosed embodiments discussed herein may be beneficially used in connection with other food products and with non-food products. For example, the teachings, disclosure and recitation of claimed subject matter set forth herein may be applicable for example to soft serve, frozen yogurt, milkshake, smoothies, beverage, and frozen beverages, as well as to carbonated drinks, and many other types of food and non-food products.

Components and arrangements suitable for use as the main system structure 1000 are illustrated, for example, in issued U.S. Pat. Nos. 6,536,224, 6,625,993, 8,528,786, 8,701,939, 8,875,732, and 9,388,033, and in Published Pending U.S. Patent Application Nos. 20100293965 and 20160089702, the relevant disclosure of which are incorporated herein by reference in its entirety. For purposes of easy discussion, at a high level, the illustrated frozen product dispenser 1000 may be considered as including four basic operational systems.

Initially, the illustrated frozen product dispenser 100 includes a product storage system that includes basins in the form of hoppers 101 and 102 that are designed to receive and store the product to be frozen and dispensed. Access to the hoppers 101 and 102 may be provided via removable lids 103 and 104 and product to be frozen and dispensed may be poured into the hoppers 101 and 102. As described in the illustrated exemplary system, the product storage system may include components to (i) quickly bring the product in the hoppers 101 and 102 to a desired temperature, (ii) to maintain the product in the hoppers at a desired temperature and (iii) to control the flow of heat into and from the contents of the hopper so as to subject the contents to various processes—such as a pasteurization process. In addition, the product storage system may include sensors and systems for detecting, directly and/or inferentially, the level of product in the hoppers 101 and 102 to alert the operator of the frozen product dispenser when the contents are low and/or in a condition wherein dispensing should be halted. The product storage system includes fill tube assembly/mix-tubes 232 to deliver the product from the hoppers 101, 102 to the freezing barrels 105, 106.

In addition to the product storage system, the illustrated frozen beverage dispenser further includes a product freezing system that includes one or more freezing barrels 105 and 106 that receive product from the hoppers 101 and 102 and freeze the product for subsequent dispensing. In the illustrated embodiment, the product freezing system also includes a rotating scraper or beater positioned inside the freezing barrels (not specifically illustrated in FIGS. 1A-1C) that are driven, in a controlled manner, by drive motors (one of which 120 is illustrated in FIGS. 1B and 1C). Additional details of the product freezing system are provided below.

The illustrated frozen product dispenser 100 further includes a refrigeration system that includes a compressor 130 and a condenser 132. In operation, the refrigeration system provides compressed refrigerant to the evaporators within the product storage system and the product freezing system to cool the stored product and/or freeze the product in the freezing system, and receives vapor from the evaporators that is then compressed, passed through the condenser, and provided to the product and storage systems to repeat the refrigeration cycle.

Further, the illustrated frozen product dispenser includes a dispensing and interface system that includes dispensing valves 140 and 141 and a control and man-machine interface 150. As described in more detail below, the dispensing valves 140 and 141 may be actuated to dispense frozen product from the freezing barrels and/or locked out to prevent the dispensing of product. The man-machine interface 150 may be used to permit configuration of the frozen product dispenser 100 and/or the input of data that can be used to control the operation of the dispenser. It can also be used to provide notices and information from the dispenser to the operator of the frozen product dispenser.

It will be appreciated that the four systems described above are not necessarily isolated from each other and that the placement of a specific physical component within one system is, to some extent, arbitrary. For example, the evaporators used to cool the contents of the hoppers 101 and 102 could almost equally be considered part of the product storage system or the refrigeration system. The references to the various systems contained herein should, therefore, not to be considered physical aspects of the described frozen product dispenser 100, but rather concepts useful in describing various aspects of the structure and operation of the exemplary systems, methods and apparatus discussed herein.

As reflected most specifically in FIG. 1C the frozen product dispenser also includes various support and shrouding elements that are not specifically numbered or discussed but will be understood to form part of the dispenser structure.

Figure 2:
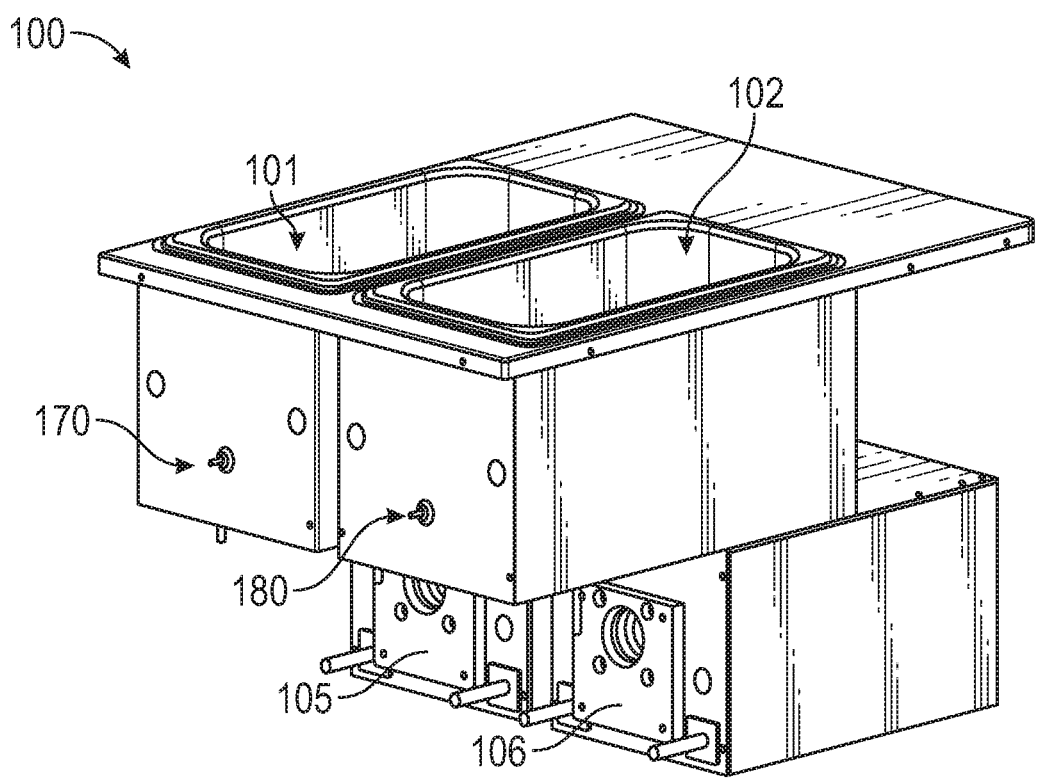
FIG. 2 illustrates certain details an exemplary frozen product dispenser in which the hopper is positioned above the mixing and freezing barrel in accordance with certain teachings set forth herein.

Certain details of the product storage system are generally provided in FIG. 2.

FIG. 2 illustrates certain details an exemplary frozen product dispenser in which the hopper is positioned above the mixing and freezing barrel in accordance with certain teachings set forth herein. As reflected in FIG. 2, the exemplary product storage system includes hoppers 101 and 102, which, in the illustrated example, are in the form of stainless steel basins. Freezing barrels 105 and 106 are located below hoppers 101 and 102 allowing gravity to draw product from the hoppers 101 and 102 into the freezing barrels 105 and 106. An opening in each hopper is provided to receive a single sensor 170 and 180. The sensors 170 and 180 may take various forms and can be capacitance sensors, resistive sensors, infrared sensors, acoustic sensors, mechanical float sensors or any other suitable sensors. In the illustrated example, the sensors 107 and 108 are conductive sensors whose output varies between two states, one corresponding to a situation where the sensor is covered with product in the hopper, and the other where the level of product in the hopper has dropped to a level such that the sensor is no longer covered with the product to be dispensed.

Figure 3:
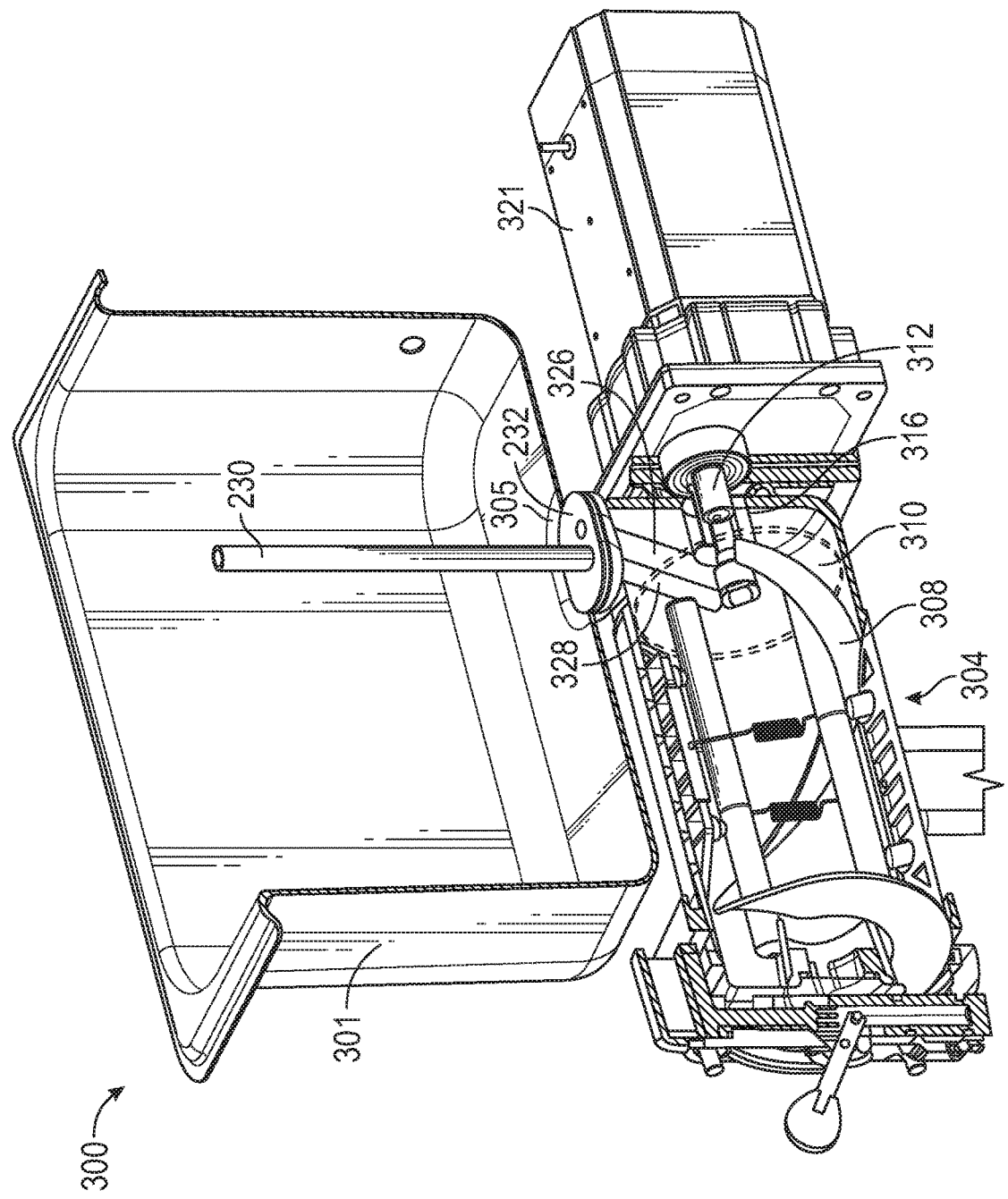
FIG. 3 illustrates an isometric cross-sectional view of exemplary frozen product dispenser showing a single hopper, a freezing and mixing barrel, a separation plate, and a mixing tube of an in accordance with certain teachings set forth herein.

FIG. 3 illustrates an isometric cross-sectional view of exemplary frozen product dispenser showing a single hopper, a freezing and mixing barrel, a separation plate, and a mixing tube in accordance with certain teachings set forth herein. As reflected in FIG. 3, hopper 300 is formed to provide a low point 305 and a funnel-like structure that narrows towards the low point. An opening is provided at the low point of hopper 301 to facilitate the flow of the product. This design thus results in gravity feeding product placed into the hopper 301 to, and through the openings at the low points, thus allowing the gravity-fed filling of product from the hopper 301.

Figure 4:
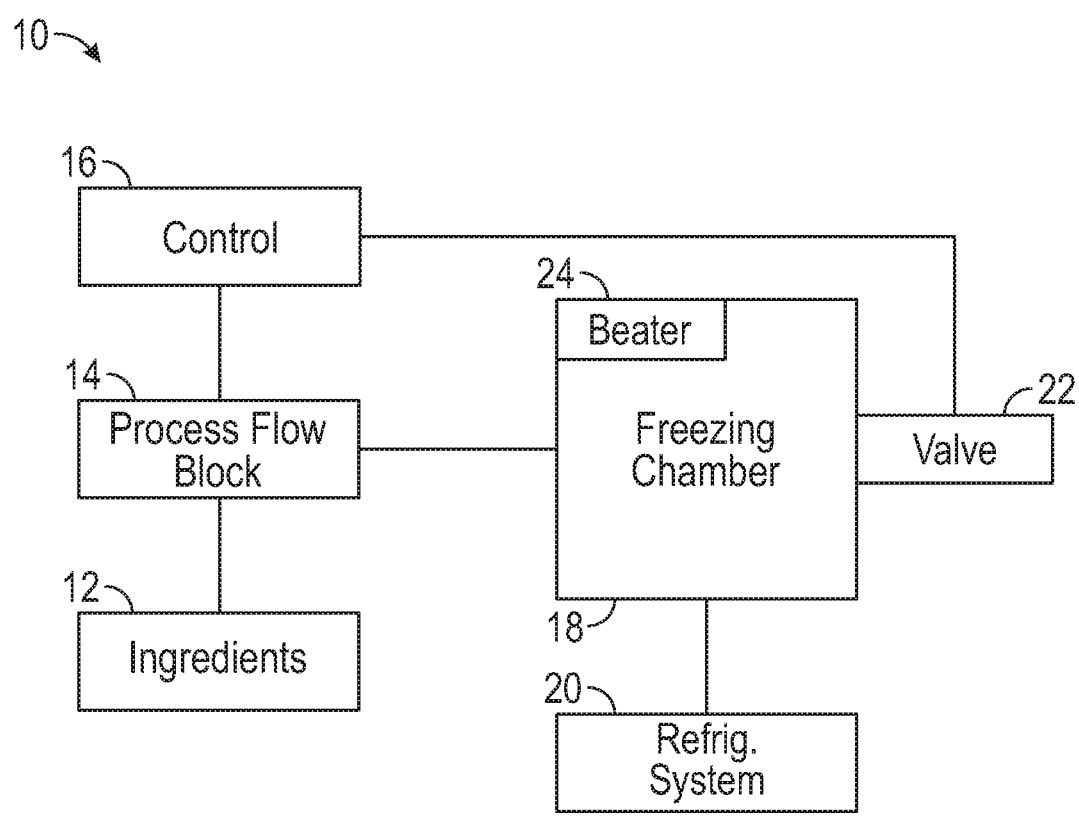
FIG. 4 is a schematic diagram of a frozen beverage machine in accordance with certain teachings of the present disclosure.

FIG. 4 is a schematic diagram of a frozen beverage machine in accordance with certain teachings of the present disclosure. FIG. 4 is a simplified block diagram schematically illustrating components of a frozen beverage machine 10 in accordance with certain teachings of or could be used in conjunction with the present disclosure. In FIG. 4, the frozen beverage machine 10 is an exemplary frozen beverage machine constructed in accordance with certain teachings set forth herein. The frozen beverage machine 10 includes an ingredients supply source 12, a process flow block 14, a controller 16, and a product freezing chamber or barrel 18. In the exemplary frozen beverage machine 10, the ingredient supply source 12 may include, for example, a water supply, syrup supply and a gas supply, or alternatively it may contain a dairy mix In the illustrated embodiment, the barrel 18 comprises a freezing chamber having a refrigeration system 20 associated therewith. The barrel 18 further comprises a beater 24. The product chamber or barrel 18 may comprise an evaporator in the refrigeration system 20. The frozen beverage machine 10 may alternatively have one or more barrels. Further descriptions of frozen beverage machines are provided in U.S. Pat. Nos. 5,706,661; 5,743,097; 5,799,726; 5,806,550; 6,536,224 and 6,625,993 by J. I. Frank, et al. The entire disclosures of these patents are incorporated by reference. Other known frozen beverage machines may be used in conjunction with methods and apparatuses disclosed in the present disclosure.

The chamber or barrel 18 is where product or liquid is frozen and maintained before dispensing. Initial pull down (IPD) is a process of freezing a liquid in the barrel 18 from a liquid state to a frozen ready to serve state. This occurs when barrel is initially filled with liquid ingredients and the refrigeration system is cooling the freezing barrel 18. The thaw period or thaw cycle occurs when one of the barrels 18 of the frozen beverage machine 10 is turned on, but the refrigeration system 20 is off. The product or liquid in the barrel 18 is frozen and ready to serve, but is naturally thawing and not being frozen by the refrigeration system 20. The initial pull down freeze cycle or refreeze cycle occurs when one of the barrels 18 of the frozen beverage machine 10 is turned on and the refrigeration system 20 is on. A freeze cycle occurs between thaw cycles.

Beater percentage (represented as Btr %) is a measure, found by Applicants, of the torque load on the motor and is generally inversely proportional to the motor load. As such, Applicants have found that the Btr % value drops when the load on the drive motor increases. Applicants have defined that 1000% be used when the barrel is filled with a non-frozen liquid. Frozen liquids have lower values, down to 0% where the motor cannot turn the beater.

The level of the ingredients for a frozen beverage mixture are provided from the ingredient supply 12 to the process flow block 14, which controls the flow of the ingredients into the freezing chamber 18 as directed by the controller 16. The controller 16 may comprise an appropriately programmed microprocessor, suitable memory and input devices, and suitable controls. The frozen mixture consistency is controlled by any of a number of methods that turns on the refrigeration system 20 to freeze and turns off the refrigeration system 20 when the mixture reaches the desired consistency. Suitable operation of the controller 16 and other control instrumentation using circuit boards, volatile and non-volatile memory devices, software, firmware, and the like is described, for example, in U.S. Pat. No. 5,706,661 incorporated by reference above. The product is then dispensed through a dispensing valve 22.

Figure 5:
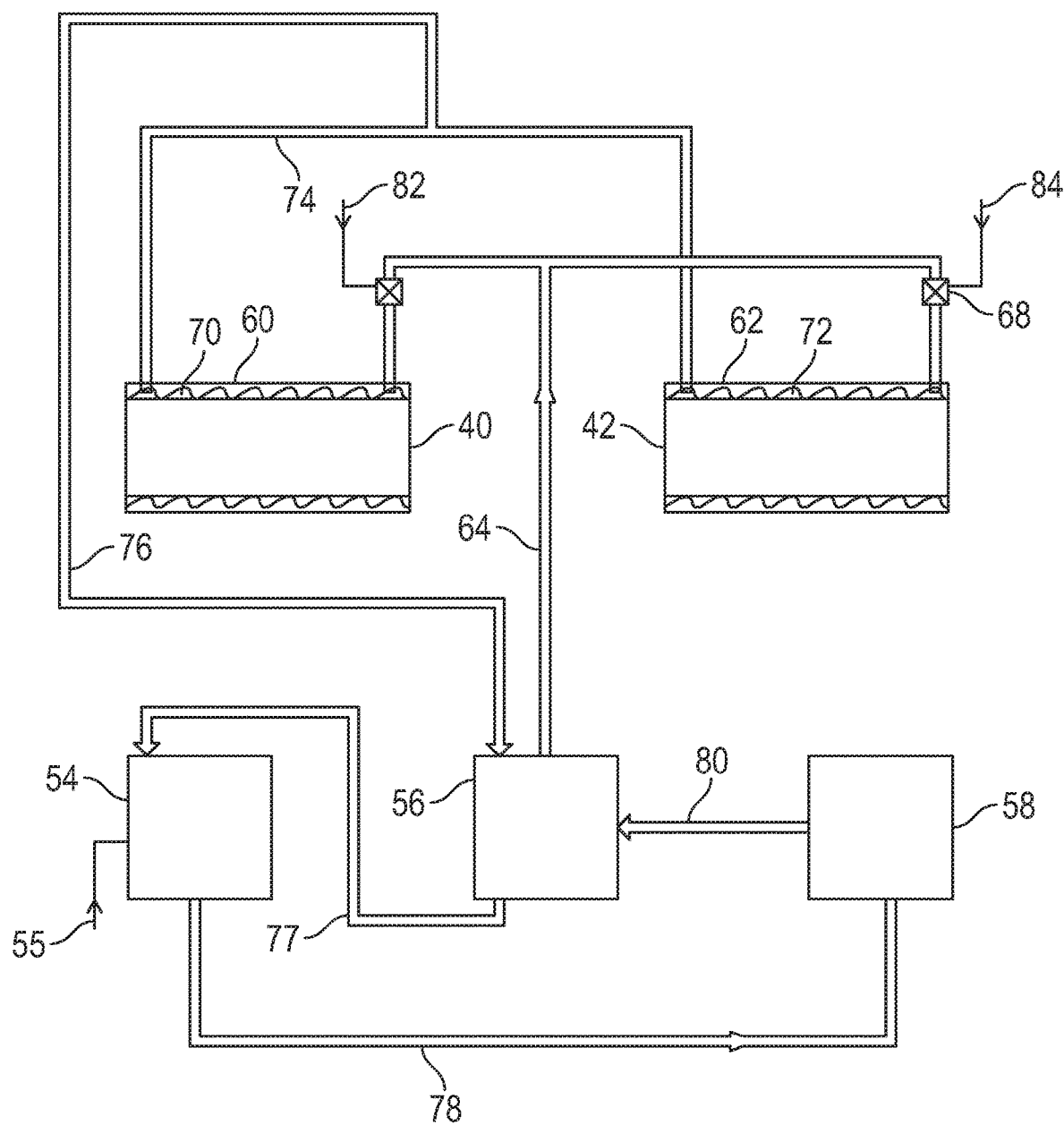
FIG. 5 is a block diagram conceptually illustrating a refrigeration system of a frozen beverage machine in accordance with certain teachings of the present disclosure.

FIG. 5 illustrates a block diagram conceptually illustrating a refrigeration system of a frozen beverage machine in accordance with certain teachings of the present disclosure. The refrigeration system includes a compressor 54, a heat exchanger 56, a condenser 58, and a pair of evaporators 60 and 62, as shown in FIG. 5. In another embodiment, the heat exchanger 56 may be a unit comprising a heat exchanger and accumulator. The heat exchanger 56 is connected by a line 64 to pulse modulated expansion valves 66 and 68, which control delivery of the condensed refrigerant to the evaporators 60 and 62, respectively, which envelope mixing chambers 40 and 42. In an alternate design, the pulse modulated expansion valves 66 and 68 may be substituted by other types of thermal expansion valves. The evaporators 60 and 62 are each defined by a sleeve having an advancing helical groove formed along its inner circumferential surface. The evaporators 60 and 62 are preferably shrink fitted onto the outer surfaces of mixing chambers 40 and 42, respectively. The helical grooves define flow paths 70 and 72, which encircle the mixing chambers 40 and 42, respectively. The refrigerant flows through the flow paths 70 and 72 so as to come into direct contact with the walls of the mixing chambers 40 and 42, respectively. This provides for efficient heat transfer. The flow paths 70 and 72 empty into a common outlet 74 which, in turn, is connected to the heat exchanger 56 by line 76.

The heat exchanger 56 delivers the expanded refrigerant to the compressor 54 via line 77. The compressor 54 delivers the refrigerant to the condenser 58 via line 78. The condenser 58, in turn, delivers the refrigerant to the accumulator 56 via line 80. The operation of the various components of the refrigeration system is well known in the art, and therefore will not be further discussed herein.

It should be understood, however that—unless explicitly so indicated—the teachings, disclosure and recitation of refrigeration systems set forth herein is not limited to this embodiment specifically. The operation of the various components of the refrigeration system is well known in the art and may be used in combination with or in replacement of this particular embodiment.

Applicants have further created improved methods and apparatuses to control the refrigeration and freezing systems of exemplary frozen product machines disclosed herein.

Applicants have further created improved methods and apparatuses for refrigeration temperature sensor offset detection. The exemplary refrigeration temperature sensor offset detection is a method of early detection of an offset of a temperature sensor being used for feedback as part of a refrigeration system of a frozen beverage dispenser. The outcome of this detection is not a precise offset measurement but rather if the offset is significant enough to not be within certain desirable parameters for the refrigeration system of the frozen product dispenser, and thusly used as the input to refrigeration control algorithms, it may be discarded. This has an advantage over testing the sensor input against its defined range, as this method cannot detect an offset. As an example, a significant offset in the return temperature being used to calculate superheat as input to a superheat refrigeration controller can render the controller completely ineffective. This can lead to a frozen beverage dispenser being completely inoperable. Once the input—which has been determined to not be within desirable parameters—is discarded, other control methods that can be effective without the temperature sensor may be used.

The methods Applicants have created offer more robust refrigeration control by early detection of bad sensory input from the evaporator's return temperature sensor. Historically used methods to determine the validity of a temperature sensor input involves testing its input against the entire accepted operating range of that sensor. For example, if the operating range of the sensor and analog measurement circuitry for a temperature sensor is from −40° F. to 90° F. (−40° C. to 32.2° C.), a temperature reading is said to be valid as long as it falls within this range. In extreme cases, such as a circuit fault resulting in the sensor not being connected, or a short circuited sensor, or any number of other problems, the temperature reading will fall outside the valid range and be noted as invalid. It should not then be considered for input into refrigeration control methods.

For example, in cases where the temperature reading is offset by some amount such as +30° F. (an offset of +16.7° C.), a reading of 0° F. (−17.8° C.) will read as a 30° F. (−1.1° C.). This increases the superheat reading by that offset, for which a superheat refrigeration controller, for instance, will try to compensate by reducing the superheat. Previous methods for checking the validity of a temperature input will not be able to detect this condition. The 30° F. (+16.7° C.) offset falls within the acceptable range and therefore may appear reasonable. But as described in the last paragraph, this is not acceptable.

The methods and inventions disclosed herein may use a more precise range by checking the evaporator's return temp sensor under known conditions and assumptions.

Figure 6:
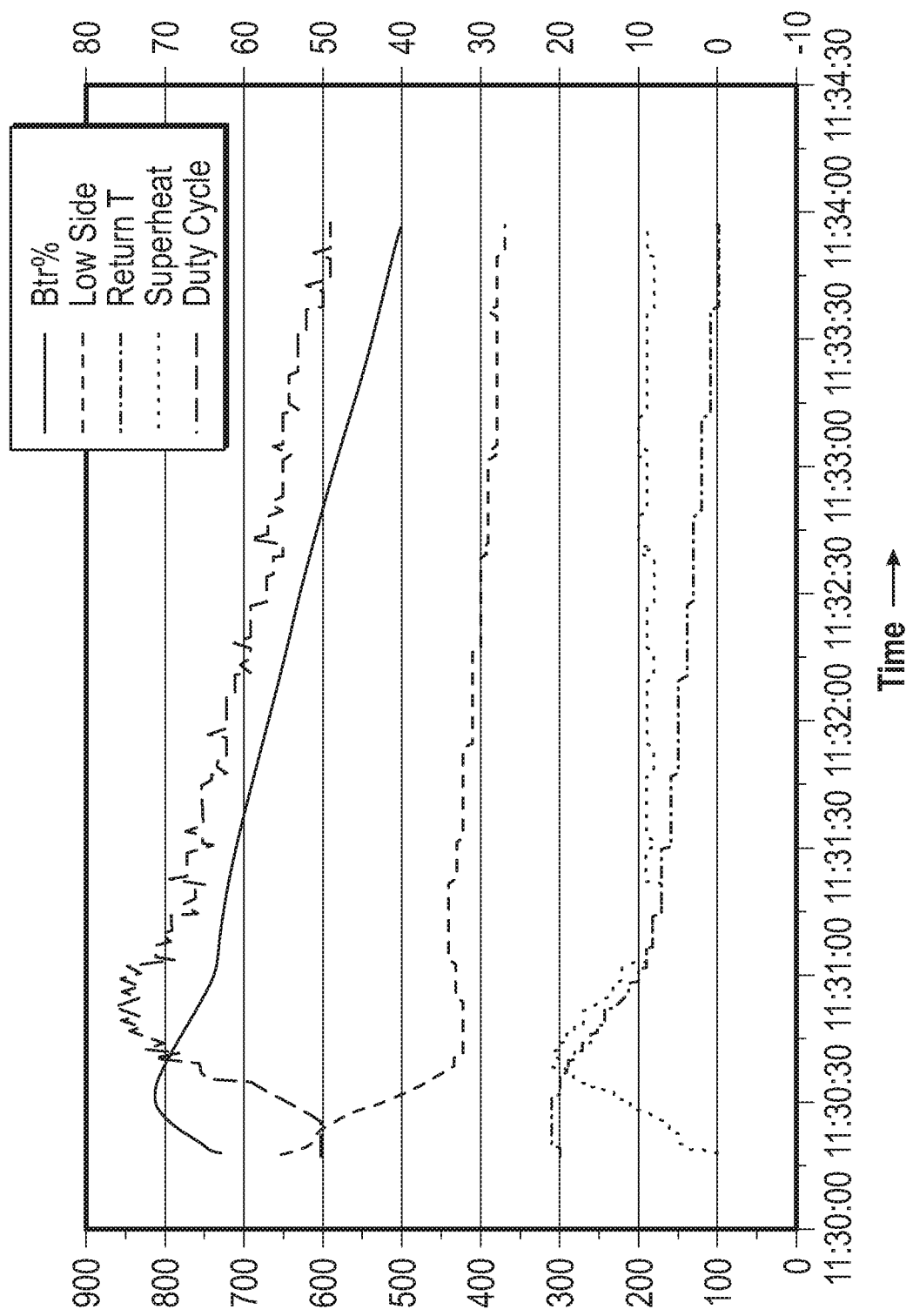
FIG. 6 illustrates a chart of various data collected from sensors during the freeze cycle of an exemplary dispensing system in accordance with certain teachings of the present disclosure.

FIG. 6 illustrates a chart of various data collected from sensors during the initial cooling cycle of an exemplary dispensing system in accordance with certain teachings of the present disclosure—more particularly an example of a the initial cooling cycle of a shakes and smoothies dispenser. It demonstrates a settling period followed by a stable period in which the return temperature drops slowly as the product freezes down. This graph represents a refreeze over time wherein the mix has been frozen, has thawed and the mechanisms are activated to chill it. The "Btr %" line represents a parameter that is inversely correlated to the viscosity of the product in the freezing barrel and is measured from the torque imparted to the beater motor from the product in the freezing chamber. A value of 0% represents a solid that the beater cannot push against and a value of 1000% represents a fluid with a consistency near that of water. This value is applicable to all frozen beverage machines regardless of their size or other operating parameters, which may differ. Therefore finding a desired quality of a product to be dispensed in one type of frozen dispenser may be quantified and applied to all other dispensers. This curve shows that the mix added to the chamber has a low Btr % value but is beaten to add air, expanding the mix and raising the Btr % value. The product "settles" while it cools producing a desirable consumable when the slope of the line flattens and remains constant. During this time, the superheat initially raises but then gradually settles as the product in the freezing barrel cools.

A first consideration of the controller is to ascertain that the data being received is valid. If a temperature sensor is rated to be reliable between a broad range then the controller may be initially programmed to accept any value within that range as valid. However, if the temperatures that it is going to measure are known to be within a much narrower range, then the controller should be programmed to only accept temperatures within that range as valid.

Figure 7:
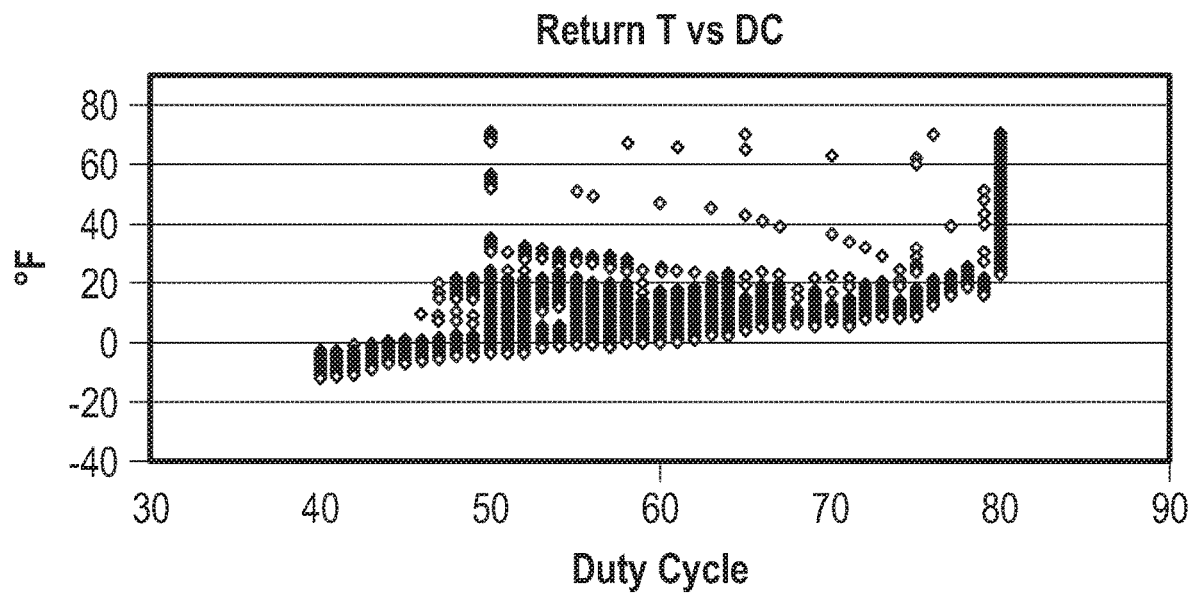
FIG. 7 illustrates a chart showing how the duty cycles of the refrigeration unit expansion valve of thirty-one freezes are plotted against the return temperature of the refrigerant in accordance with certain teachings of the present disclosure.

FIG. 6 represents a single refreeze; however the data from 31 refreezes was analyzed to determine the appropriate expected range and conditions and is shown in FIG. 7.

FIG. 7 is a plot showing the duty cycles of the refrigeration unit expansion valve of thirty-one freezes. The duty cycles of these freezes are plotted against the return temperature of the refrigerant. There are several datum of when the duty cycle was 40 and in each case the refrigerant return temperature was between 0° F. and −20° F. (−17.8° C. to −28.9° C.). At the other end, there are many datum where the duty cycle was 80 and the refrigerant return temperature was between 20° F. and 80° F. (−6.7° C. to 26.7° C.). From this, it may be determined that the valid range of the refrigerant return temperature be between −20° F. and 80° F. (−28.9° C. to 26.7° C.).

Figure 8:
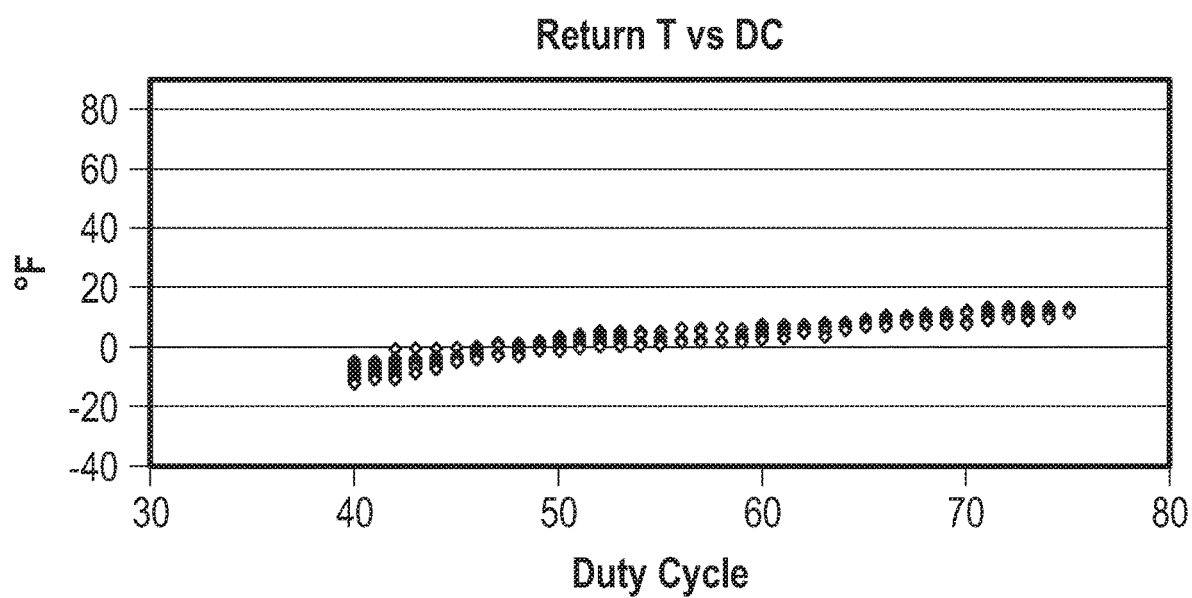
FIG. 8 is a plot showing a subset of the same data from only using the duty cycle compared to the refrigerant return temperature after two minutes had elapsed from the start of the first freeze cycle

FIG. 8 is plot showing a subset of the same data from only using the duty cycle compared to the refrigerant return temperature after two minutes had elapsed from the start of the first freeze cycle. This indicates that a far narrower range of temperatures may be selected to determine if a temperature sensor reading is valid. At first glance, the range of valid readings could be set as between −20° F. and +20° F. (−28.9° F. to −6.7° C.). However, since the data are linearly aligned, further narrower ranges may be imposed relative to the duty cycle. For instance, a range of between −20° F. and +10° F.

(−28.9° C. to −12.2° C.) may be imposed for when the duty cycle is between 40 and 60, and a range between 0° F. and 20° F. (−17.8° C. to −6.7° C.) may be imposed between duty cycles 60 to 80. Those skilled in the art will be able to segment these ranges by duty cycles as appropriate and will know what additional margin of safety will need to be added to each range for proper operation.

It is acknowledged that there is a risk that the temperature sensor may fall out of this range but also be valid. This could occur in instances where the refrigeration charge is out of specification, or the condenser fan is inoperable, or the airflow to the unit is blocked, or any other source that may cause the refrigeration system to be ineffective. This method alone cannot distinguish between an invalid sensor condition and these other instances. However, the result in these cases is that the frozen beverage dispenser will continue to attempt to freeze using other control methods that may be slightly less effective, but will still dispense a product satisfying to a consumer. Furthermore, the fact remains that there is an error condition that needs to be resolved and troubleshooting of this error condition should include validating that the temperature sensor is indeed bad and ruling out other causes.

Figure 9:
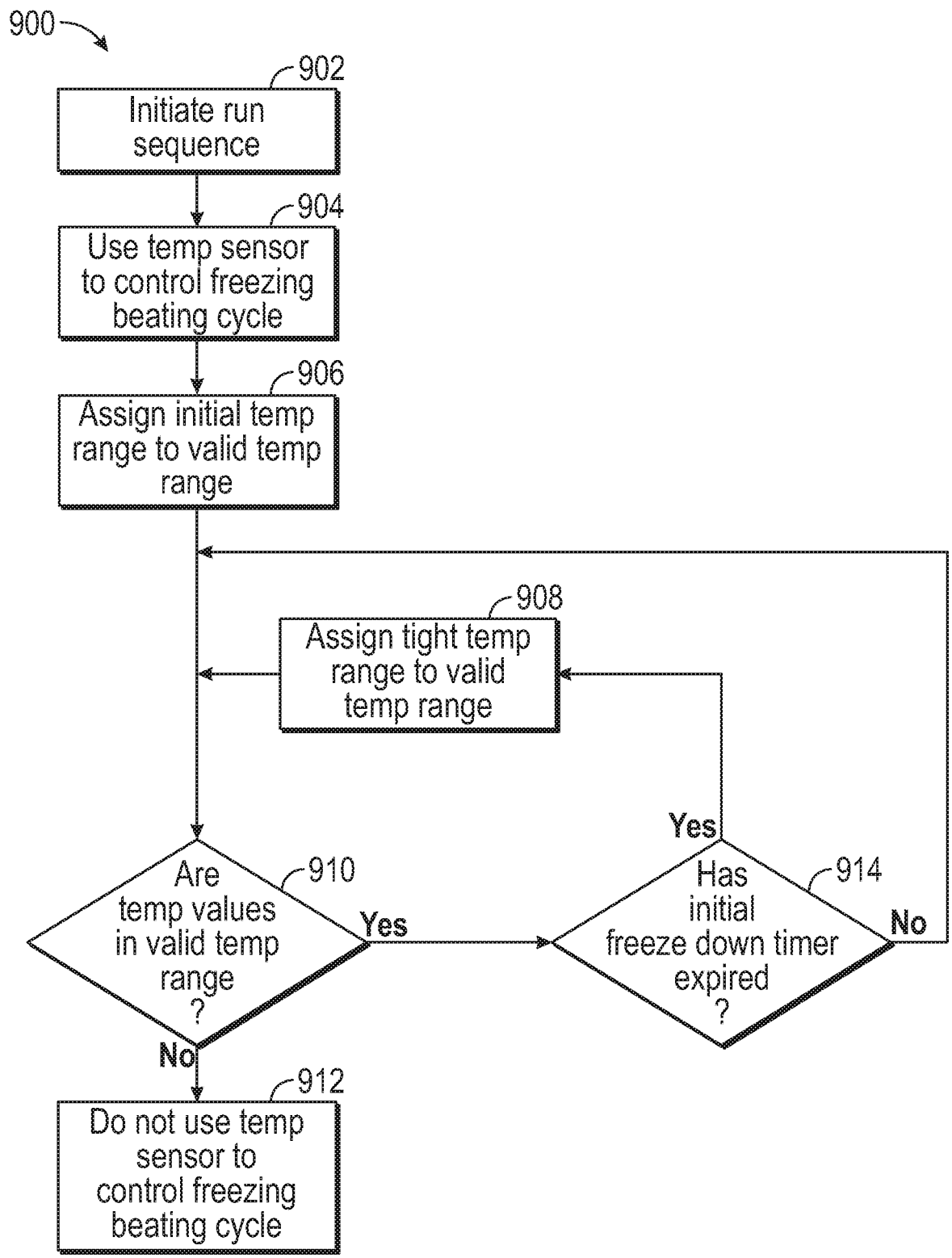
FIG. 9 is a flow diagram illustrating an exemplary refrigeration temperature sensor offset detection logic of a frozen beverage machine in accordance with certain teachings of the present disclosure.

FIG. 9 is a flow diagram illustrating an exemplary refrigeration temperature sensor offset detection logic of a frozen beverage machine in accordance with certain teachings of the present disclosure. A decision point for moving from the broad range of valid temperature sensor values to a narrow one is represented as a time after the initial pull down has started. One of ordinary skill in this art will recognize that other metrics may be used rather than a simple timer. Also, those skilled in the art will recognize that a logic path such as described in FIG. 4 may be applied to any sensor input, even those other than temperature sensor values.

FIG. 9 may be described as a routine contained within the overall control process. The process 900 may be first invoked when the exemplary frozen product dispenser is first started. The process 900 may then be invoked at any time, and as often as the validity of the inputs needs to be validated thereafter. This may be done at the receipt of each new input value, or delayed until some number of inputs have been received, or delayed until some amount of time has passed since it was performed before. Invoking this subroutine starts with initiating the run sequence 902. When this routine starts, input from the temperature sensor will be received 904 and will be indexed with the corresponding duty cycle of the PWM valve. Next, the initial temperature range for each PWM valve duty cycle will be assigned 906 consisting of a broad range of values. As was noted earlier, this temporary range will be broad enough and contain enough of a margin of safety to cover the startup process where the readings are expected to vary widely for each corresponding duty cycle. A comparison 910 will be made between the temperature reading received and the assigned temperature range where both are indexed to the duty cycle. If the received temperature reading is not within the assigned initial temperature range then the controller will not use the received temperature reading 912 and will control the freezing/heating cycle without this input. However, if the received temperature reading is within the initial temperature range assigned then it may be used as input to control the freezing/heating cycle of the overall control process. Processing continues by making another decision 914 to determine if the initial freeze down timer has expired. As noted earlier, this may be 2 minutes during a refreeze cycle. If that timer has not expired, the temporary initial temperature range, assigned in 906, will continue to be used to compare new temperature readings received. However, if the timer has expired, the tighter valid temperature range, indexed to the duty cycle, will be used 908 as the comparator in making a validity decision 910.

Applicants have found that while accurate measure have been found using a time period of 2 minutes for a refreeze cycle, more accurate measures have been found using a time period of 4 minutes. Similar measures were obtained for measures during an initial freeze where the contents in the freezing barrel are still liquid and have not been frozen. In that case, an initial time period of 20 minutes has been found to provide accurate measures.

Another exemplary embodiment of this invention may be that the process may continue even after the decision has been made to not use the readings from the temperature sensor because it is outside the accepted range for that duty cycle. In this case, the readings may continue to be received and compared to the assigned valid range but not used to control the freezing/heating cycle unless the readings start falling within the accepted valid range indexed to the duty cycle. This may happen if an operator or technician notices that a sensor has fallen away from where it is supposed to be and appropriately reattaches it. In that case, extra steps may be taken to validate the temperature readings against other known inputs received during normal operations.

Applicants have further created improved methods and apparatuses for controlling the refrigeration by using the beater load rate of change in non-linear manner. This exemplary control method may be used as a backup control method to control methods using superheat and pressure measures, or may be used as a standalone method. Its advantages include that it does not require temperature or pressure measures for feedback. Moreover, it may more directly influence the speed of the freeze than other known control methods.

One prior art method of making decisions for controlling the refrigeration system has been to monitor the beater load and compare its measures to a table. If the beater load was not at a predicted point along a line representing a freeze, then the duty cycle of the refrigeration system could be adjusted to either freeze faster or slower. This method may not respond appropriately to several conditions, and may cause the system to become unstable as it attempts to refrigerate using this rote method.

The inventions disclosed herein may use indirect feedback information to make adjustments to the duty cycle of the refrigeration system. In one embodiment, the change in the rate of the beater load has been found to be an effective method for controlling the duty cycle of the refrigerant system. Applicants have found that by using this method, the refrigeration system may be effectively controlled without the use of direct feedback methods of parameters such as suction pressure or return temperature. This allows the system to continue operations even when some sensors normally used in the system become inoperative.

In one exemplary method of using indirect feedback to control the system, Applicants have found that the rate of change of the beater load may be used as an input to the controller. This may be seen in the following formula.

$$\text{Input} = (\text{BTR \%}[n] - \text{BTR \%}[n-j])/j$$

n=current sample
j=previous sample index (10 was used)

In this, the values for BTR % at a number of times may be recorded and indexed. A BTR % value at time "j" may be represented as BTR % [j] and a BTR % value at time "n" may be represented as BTR % [n]. In this formula, an input may be determined by finding the current BTR % value, represented as BTR % [n], subtracting a difference between the current and a prior BTR % value, and dividing the result by the sample index. In an exemplary embodiment, Applicants chose to sample the BTR % once per second so that BTR % [j] was the BTR % value obtained 10 samples before the most current sample was taken. Other samples and comparisons may be envisioned and utilized without departing from the spirit of the inventions disclosed herein.

Figure 17:
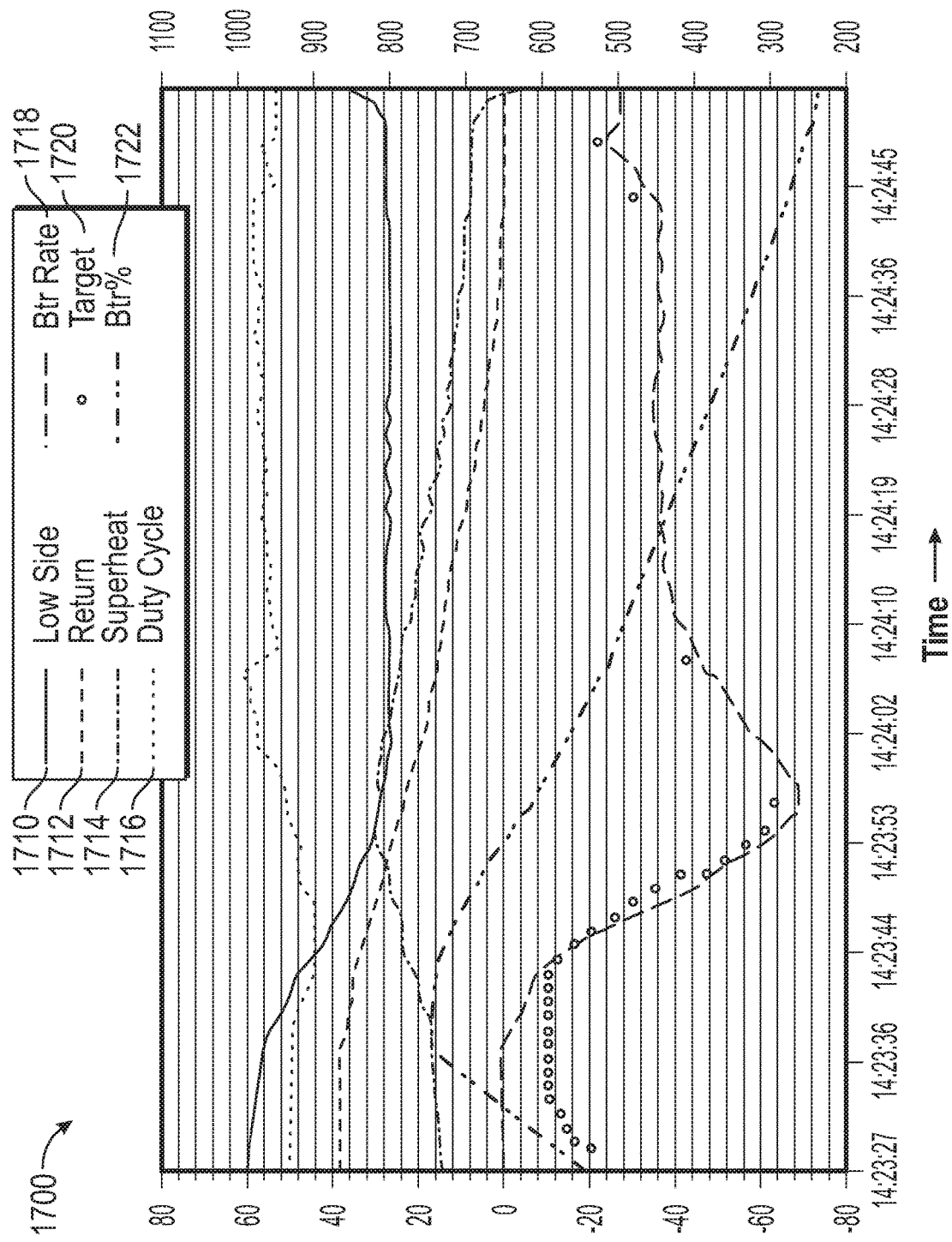
FIG. 17 illustrates a chart of various data collected from sensors during the freeze cycle of an exemplary dispensing system in accordance with certain teachings of the present disclosure.

FIG. 17 illustrates a chart of various data collected from sensors during the freeze cycle of an exemplary dispensing system in accordance with certain teachings of the present disclosure. Represented in this are the low side pressure 1710, the return pressure 1712, the superheat 1714, they duty cycle 1716 and the BTR % 1722. Calculations are made from samples of the BTR % 1722 to find an input as described. In FIG. 17, the input is shown as a BTR Rate 1718, which is not shown to scale. At each 10 samples in this figure, a target 1720 is calculated. This input is then used to control the duty cycle of the refrigeration system. Successive values of "Input" will result in different duty cycles used in the freezing process until the desired BTR % value is attained. As may be understood by those of ordinary skill in the art, the BTR % 1722 shows a desirable freezing rate.

As may be appreciated by those skilled in the art, other algorithms may be used to determine an input to the controller. As one of many examples of this, the index of previous samples may be exponentially decayed as opposed to sequentially decreased.

Figure 12:
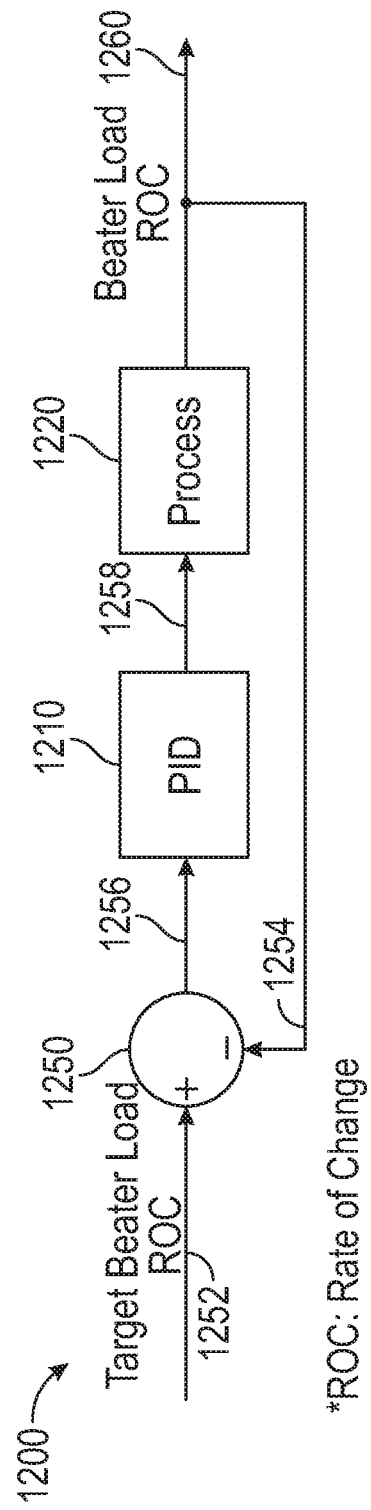
FIG. 12 illustrates a block diagram of beater load rate controller in accordance with certain teachings of the present disclosure.

FIG. 12 illustrates a block diagram of beater load rate controller in accordance with certain teachings of the present disclosure. Process 1200 contains a PID controller 1210, and a processor 1220. Various inputs are sent to the PID 1210. The PID 1210 sends the PID output 1258 to the processor 1220. The processor controls various functions of the food dispensing system such as the refrigeration duty cycle. The PID 1210 may also receive other inputs such as the Beater Load Rate of Change (ROC) 1254 and a Target Beater Load ROC 1252. In one embodiment, the Beater Load ROC 1254 and the Target Load Beater ROC may be compared by another process 1250 prior to being sent to the PID 1210.

As was noted previously, the viscosity measurement in a frozen beverage/dessert dispenser may be done measuring the beater motor load. These exemplary methods and systems may build upon the inventions disclosed herein, in which the refrigeration control, and other controls, are achieved solely using the beater motor load rate of change which is advantageous for controlling the process without additional refrigeration sensors. However, the rate of freezing can be increased in some cases by raising the duty cycle while in other cases by lowering the duty cycle. This non-linear behavior may be due to there being an imbalance between mass-flow of refrigerant versus the temperature of the refrigerant. As such, the performance of a controller using beater load Rate of Change ("ROC") may become unstable. However, due to a non-linear correlation between duty cycle and rate of freezing, improvements are required as a PID is not well suited for non-linear applications. The inventions disclosed herein further stabilizes the controller by accounting for this non-linearity. This may be achieved using the duty cycle as feedback for PID gain scheduling.

In a frozen product dispenser (soft serve, frozen yogurt, milkshakes, smoothies, beverages, etc.), a refrigeration system typically uses a metering device with some control mechanism or algorithm. Typically, a parameter such as superheat is used to control this metering device. This invention includes the control of the metering device using the rate at which the product is freezing through measuring the load of the beater motor.

PID gain scheduling may correct the weaknesses of PID when applied to non-linear systems. This exemplary method uses the duty cycle to the refrigeration's metering valve as feedback, which becomes an input to the PID gain scheduler.

Figure 10:
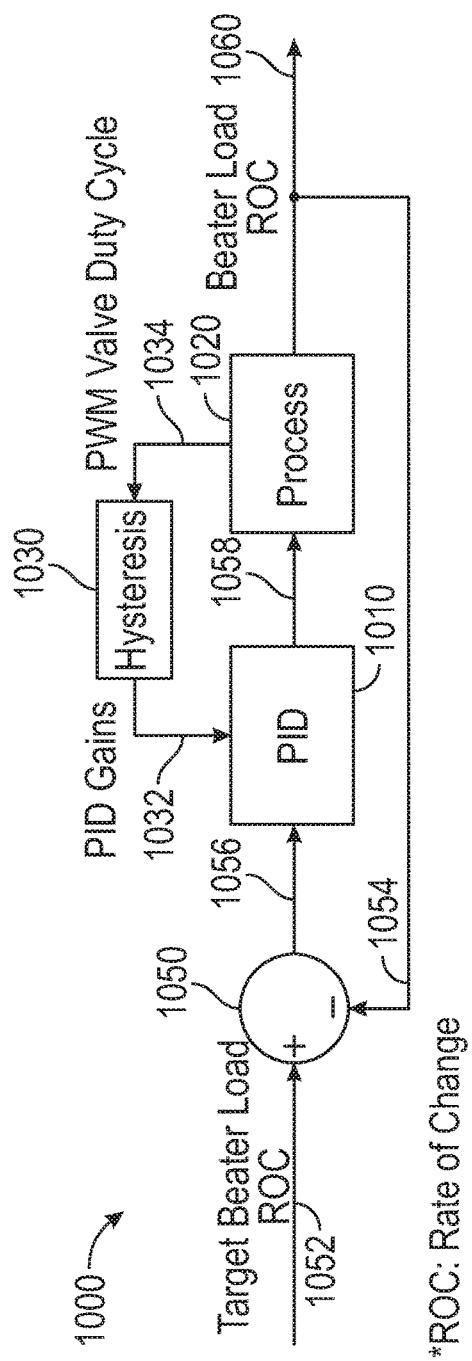
FIG. 10 illustrates a control block diagram of an exemplary method of duty cycle hysteresis gain scheduling in accordance with certain teachings of the present disclosure.

One embodiment of this exemplary method uses hysteresis for gain scheduling. By accounting for where the duty cycle has been previously, the PID gains can be set such that it accounts for the state of the system and knows whether to increase mass flow or decrease temperature by raising or lowering the duty cycle. FIG. 10 illustrates a control block diagram of an exemplary method of duty cycle hysteresis gain scheduling in accordance with certain teachings of the present invention. Since PIDs are usually applied to linear systems, they may not always perform optimally within non-linear systems. To address this, Applicants have found that some other sensor measures, accumulated and utilized over time, may be used as inputs to the gain scheduler. One embodiment of the inventions disclosed herein may be to use the duty cycle of the refrigeration's metering valve as feedback.

Process 1000 contains a PID controller 1010, and a processor 1020. Various inputs are sent to the PID 1010. The PID 1010 sends the PID output 1058 to the processor 1020. The processor controls various functions of the food dispensing system such as the refrigeration duty cycle. Applicants have configured the processor 1020 to send information such as the PWM valve duty cycle 1034 to a hysteresis gain scheduler 1030. The hysteresis processor 1030 may perform comparisons of past duty cycle readings and relay those as PID Gains 1032 back to the PID 1010. The PID 1010 may also receive other inputs such as the Beater Load Rate of Change (ROC) 1054 and a Target Beater Load ROC 1052. In one embodiment, the Beater Load ROC 1054 and the Target Load Beater ROC may be compared by another process 1050 prior to being sent to the PID 1010.

Figure 11:
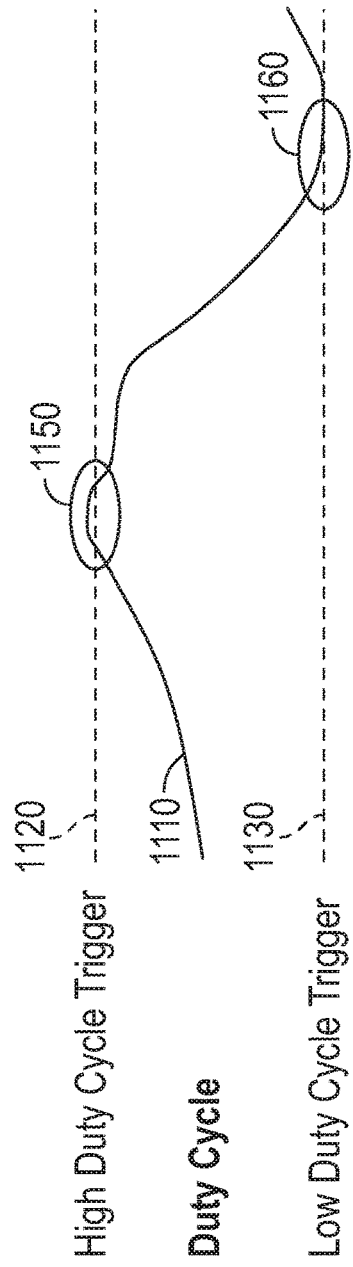
FIG. 11 illustrates an example of the block diagram of an exemplary method of duty cycle hysteresis gain scheduling in accordance with certain teachings of the present disclosure.

FIG. 11 illustrates an example of the block diagram of an exemplary method of duty cycle hysteresis gain scheduling in accordance with certain teachings of the present disclosure. This may be utilized as the hysteresis gain scheduler 1030 as was illustrated in FIG. 10. The method shown in FIG. 11 uses the PWM valve duty cycle 1110 as input to a gain scheduler to correct the PID control output. The duty cycle curve 1110 is arbitrary and the rate of change exaggerated to demonstrate the hysteresis gain scheduling control. A high duty cycle trigger 1120 is established as well as a low duty cycle trigger 1130. Initially, the PID gains are such that the duty cycle and Beater Load Rate of Change (ROC) are directly proportional. Once the high duty cycle trigger point 1150 is reached, the PID gains are switched so that they are inversely proportional to the Beater Load ROC. At this point, if the rate needs to change, the duty cycle will be adjusted higher or lower. This logic applies to the lower duty cycle trigger level 1160 as well, where the PID gains are switched again.

Figure 13:
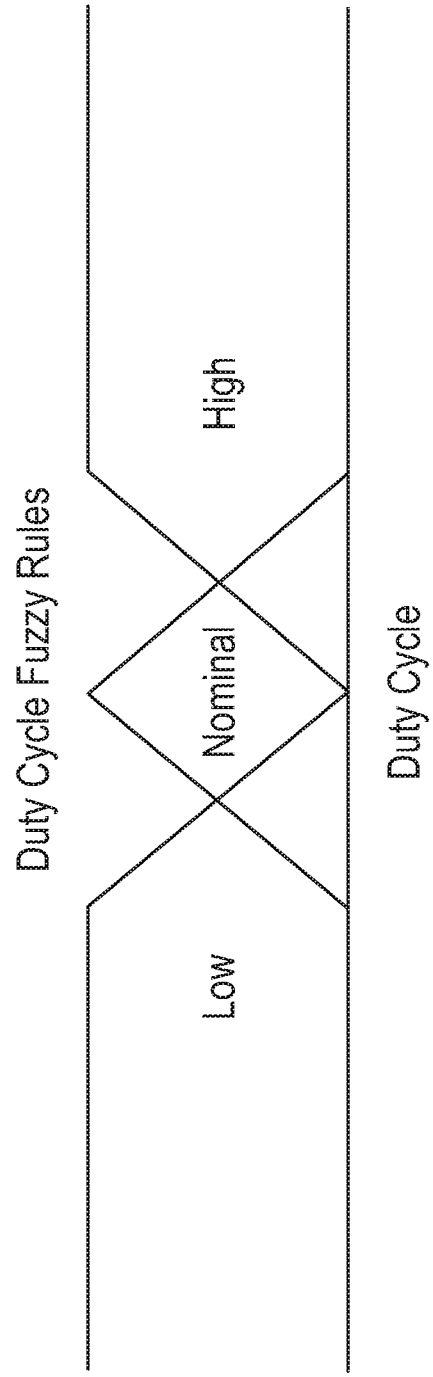
FIG. 13 illustrates an example of a fuzzy rule set in accordance with certain teachings of the present disclosure.

Applicants have also found that fuzzy rules may be utilized to control various processes in a frozen food dispensing unit. FIG. 13 illustrates an example of a fuzzy rule set using low, nominal and high rules associated with the duty cycle wherein each have PID gains associated with them. The low, nominal and high thresholds may be empirically derived. It should be noted that while three rules are illustrated here, any number of rules may be used in accordance with the teachings disclosed herein.

A defuzzification algorithm may be applied to get the final controller output. Each rule calculates the PID output with its gains. The refrigeration duty cycle is used determined to what degree it is low, nominal or high. This percentage is applied to that fuzzy rule's PID output and the mean of these weighted outputs is calculated to get the final controller output. This is shown in the following equation which assumes the duty cycle is half way between low and nominal:

$$\text{Controller output} = \frac{(PID_{low})(50\%) + (PID_{nominal})(50\%) + (PID_{high})(0\%)}{(\text{\# of fuzzy rules with some degree of truth})}$$

Figure 14:
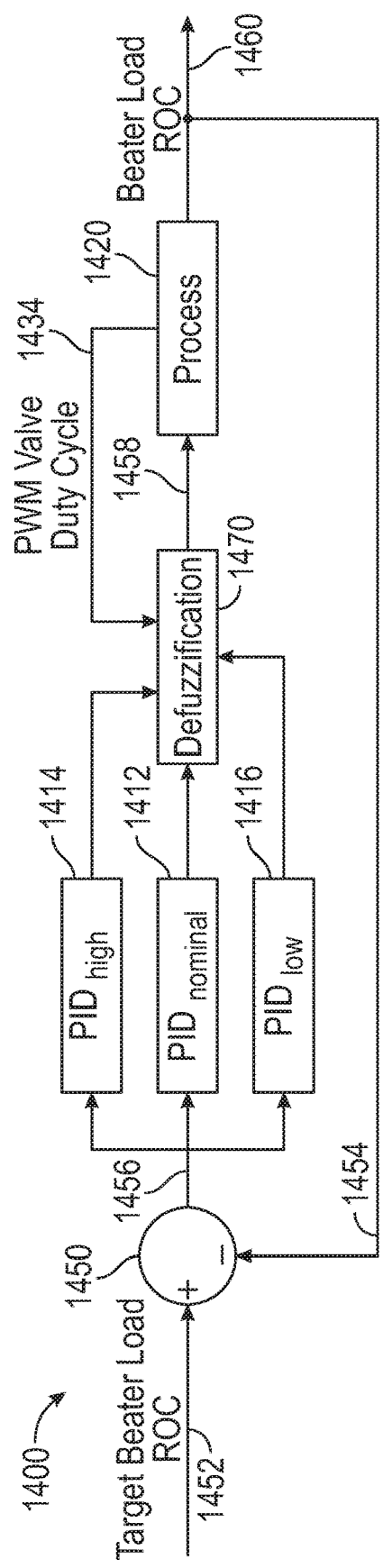
FIG. 14 illustrates a block diagram of another exemplary method of fuzzy logic in accordance with certain teachings of the present disclosure.

FIG. 14 illustrates a block diagram of an exemplary method of utilizing fuzzy logic in accordance with certain teachings of the present disclosure. Process 1400, like some other processes described herein, may compare and combine 1450 the inputs of the Target Beater Load ROC 1452 with the Beater Load ROC 144 and use that as input 1456 to a PID controller or PID controllers with different control algorithms. In process 1400, three (3) PID controllers are show: a PID controller with a high rule gain scheduling 1414, a PID controller with a nominal rule gain scheduling 1412, and a PID controller with a low rule gain scheduling 1416. Each of these provides their input to a defuzzification module 1470. The defuzzification module 1470 also has a PWM Valve Duty Cycle input 1434 from the processor 1420. The defuzzification module 1470 evaluates these inputs as described previously and provides input 1458 to the processor 1420.

Applicants have further created improved methods and apparatuses for controlling the refrigeration by using the beater load rate of change to control the refrigeration through the use of a cascaded controller. Viscosity measurement in a frozen beverage/desert dispenser is commonly achieved by measuring the beater motor load. These methods and apparatuses build upon other methods and apparatuses taught in this disclosure in which the refrigeration expansion valve control is achieved solely using the beater motor load rate of change. As was noted before, due to a non-linear correlation between the expansion valve duty cycle and rate of freezing, improvements are required as PID is not well suited for non-linear applications. These methods and apparatuses stabilize the controller by utilizing a nested refrigeration controller, which uses a linear parameter.

Figure 15:
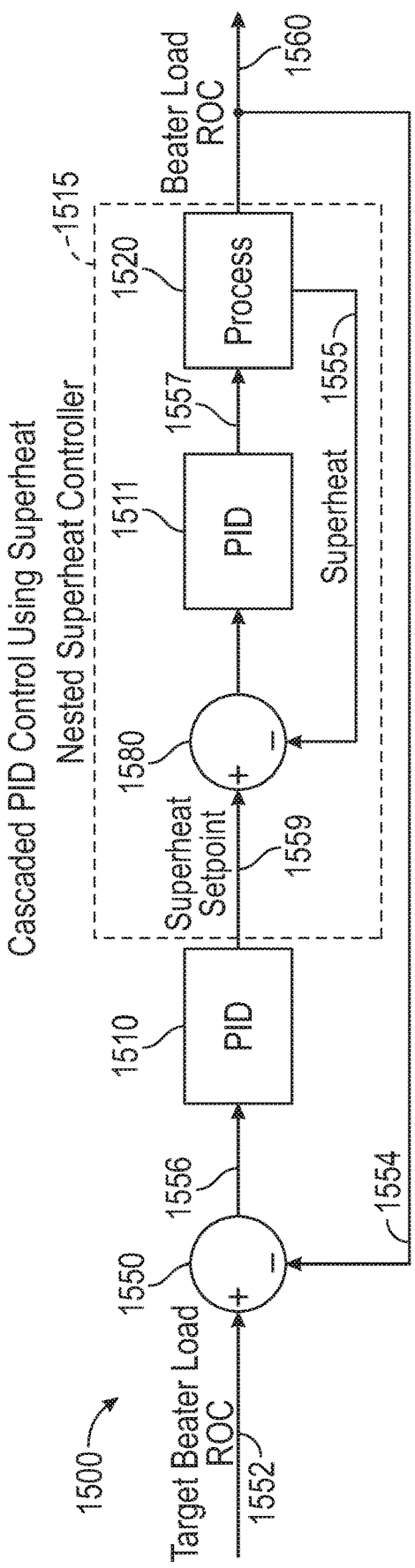
FIG. 15 illustrates a control block diagram of an exemplary method of cascaded PID Control using superheat in accordance with certain teachings of the present disclosure.
Figure 16:
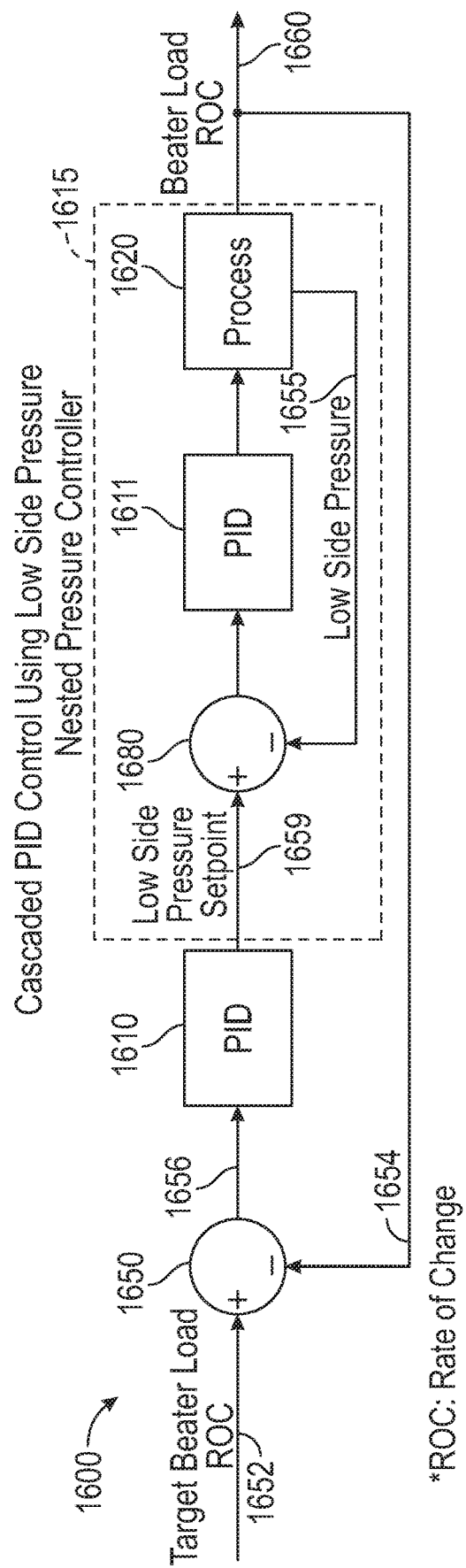
FIG. 16 illustrates a control block diagram of an exemplary method of cascaded PID Control using low side pressure in accordance with certain teachings of the present disclosure.

In accordance with certain teachings disclosed herein, a cascaded PID control is utilized to stabilize the freezing process. The beater load ROC controller adjusts the set point of a nested controller as opposed to controlling the expansion valve directly. This internal controller may be a superheat or low side pressure controller. FIGS. 15 and 16 show two examples.

FIG. 15 illustrates a control block diagram of an exemplary method of cascaded PID control using superheat in accordance with certain teachings of the present disclosure. In process 1500, the beater load ROC set point 1556 becomes an input to the nested superheat controller 1515. The superheat then achieves its target, which may directly correlate to the rate at which the product is freezing. This affects the beater load Rate of Change 1560, which is fed back to the input 1554 of the superheat controller 1515. This results in the superheat controller 1515 having much greater stability and a smaller time constant. The beater load ROC controller 1520 has a significantly longer time constant and so each PID controller 1510 has its own different gains. Process 1500 also contains a comparator 1450, the Target Beater Load ROC input 1452; the Beater Load ROC 1454; input to the PID 1556; and a superheat comparator 1580, taking input 1555 from the processor about the superheat, and the superheat setpoint 1559.

FIG. 16 illustrates a control block diagram of an exemplary method of cascaded PID control using low side pressure in accordance with certain teachings of the present disclosure. In process 1600, the beater load ROC set point 1656 becomes an input to the nested low side pressure controller 1615. The low side pressure then achieves its target, which may directly correlate to the rate at which the product is freezing. This affects the beater load Rate of Change 1660, which is fed back to the input 1654 of the low side pressure controller 1615. This results in the low side pressure controller 1615 having much greater stability and a smaller time constant. The beater load ROC controller 1620 has a significantly longer time constant and so each PID controller 1610 has its own different gains. Process 1600 also contains a comparator 1650, the Target Beater Load ROC input 1652; the Beater Load ROC 1654; input to the PID 1656; and a low side pressure comparator 1680, taking input 1655 from the processor about the low side pressure, and the low side pressure setpoint 1659.

These exemplary methods offer improved stability for controlling frozen dessert and beverage characteristics. These exemplary methods improve instability of PID control due to system non-linearity when used to control beater load ROC via a refrigeration expansion valve.

Other and further embodiments utilizing one or more aspects of the inventions described above can be devised without departing from the spirit of Applicant's invention. For example, one or more of the exemplary methods and apparatuses disclosed herein may be combined with each other or with previously known methods and apparatuses to control the refrigeration of a frozen beverage machine. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:
1. A refrigeration device comprising:
(a) a freezing chamber for freezing a product;
(b) an evaporator for cooling the freezing chamber to a temperature sufficient to permit freezing of the product;

(c) an expansion valve coupled to the evaporator for regulating the flow of refrigerant through the evaporator;

(d) a sensor for sensing the temperature of the of the refrigerant flowing through the expansion valve and generating a sensed temperature signal corresponding to the sensed temperature;

(e) a memory structure including a first set of data defining a first range of predetermined temperature values and a second set of data defining a second range of predetermined temperature values wherein the first range of temperature values is broader than and includes the second range of temperature values;

(f) a controller that receives the sensed temperature signal from the sensor and controls the operation of the expansion valve to control the flow of refrigerant through the evaporator to cool the freezing chamber; and (g) wherein, during a first time interval, the controller:
  (i) controls the operation of the expansion valve at least in part in response to the sensed temperature signal if the sensed temperature signal is within the first range of predetermined temperature values; and
  (ii) considers as inaccurate any sensed temperature signal outside the first range; and (h) wherein, during a second time interval, the controller:
  (i) controls the operation of the expansion valve at least in part in response to the sensed temperature signal if the sensed temperature signal is within the second range of predetermined temperature values; and
  (ii) considers as inaccurate any sensed temperature signal outside the second range.

2. The refrigeration device of claim 1, wherein the first time interval begins when the controller begins an operation of the expansion valve to cool the freezing chamber and ends a predetermined time period after the beginning of the first time interval.

3. The refrigeration device of claim 2, wherein the second time interval begins after the expiration of the first time interval and ends when the controller ceases operation of the expansion valve to cool the freezing chamber.

4. The refrigeration device of claim 3, wherein the predetermined time period is approximately 120 seconds.

5. The refrigeration device of claim 1, wherein the controller controls operation of the expansion valve by varying a duty cycle of the expansion valve.

6. The refrigeration device of claim 1, wherein the evaporator has a high pressure side and a low pressure side and wherein the temperature sensor senses the temperature of the refrigerant on the low pressure side of the expansion valve.

7. The refrigeration device of claim 1, wherein the span of temperatures within the second range is 40% or less of the span of temperatures within the first range.

8. In a refrigeration device having: a mixing chamber that produces a product, an evaporator, an expansion valve coupled to the evaporator for regulating flow of refrigerant through the evaporator, a temperature sensor for providing a value representative of a return temperature of the refrigerant, and a controller that receives the value from the temperature sensor and regulates a duty cycle of the valve to control the cooling of the mixing chamber, a method comprising the steps of:

(a) initiating operation of the expansion valve by the controller to cool the mixing chamber at a first point in time;

(b) for a first time interval following the initiation of the operation of the expansion valve, considering for control purposes values received from the temperature sensor that are within a first range of values and deeming inaccurate and not considering for control purposes values received from the return refrigerant temperature sensor that are outside the first range of values; and (c) for a second time interval following conclusion of the first time interval, deeming inaccurate and not considering for control purposes values received from the return refrigerant temperature sensor that are outside a second range of values, wherein the second range of values is a subset of the first range of values.

9. The method of claim 8, wherein the first time interval is approximately 2 minutes.

10. The method of claim 8, wherein the controller controls operation of the expansion valve by varying the duty cycle of the expansion valve and wherein the second range of values is determined, at least in part, based on a duty cycle with which the controller operates the expansion valve within the second time interval.

11. The method of claim 8, further comprising the step of not considering for control purposes during the first time interval any values received from the temperature sensor after the receipt of a sensor value outside of the first range of values.

12. The method of claim 8, further comprising the step of considering for control purposes values received from the temperature sensor that are within the second range of values, irrespective of whether any prior received values were outside the first or second ranges of values.

13. The method of claim 8, wherein the initial operation of the expansion valve corresponds to initial freezing of the product in the chamber.

14. The method of claim 8, wherein the initial operation of the expansion valve corresponds to a refreezing of the product in the chamber.

15. In a refrigeration device having: a mixing chamber that produces a product, an evaporator, an expansion valve coupled to the evaporator for regulating the flow of refrigerant through the evaporator, a temperature sensor for providing a value representative of a return temperature of the refrigerant, and a controller that receives values from the temperature sensor and regulates the duty cycle of the valve to control the cooling of the mixing chamber, a method comprising the steps of:

(a) initiating operation of the expansion valve by the controller to cool the mixing chamber at a first point in time;

(b) for a first time interval following the initiation of the operation of the expansion valve, controlling the duty cycle of the expansion valve and considering for control purposes values received from the temperature sensor that are within a first range of values at least partially determined by the duty cycle at which the expansion valve is being operated at the time the sensor value is received and not considering for control purposes values received from the return refrigerant temperature sensor that are outside the first range of values;

(c) for a second time interval following the conclusion of the first time interval, considering for control purposes values received from the temperature sensor that are within a second range of values, at least partially determined by the duty cycle at which the expansion valve is being operated at the time the sensor value is received, and not considering for control purposes values received from the return refrigerant temperature sensor that are outside the second range of values, wherein the second range of values is a subset of the first range of values.

16. The method of claim 15, wherein the first time interval is approximately 2 minutes.

17. The method of claim 15, further comprising the step of not considering for control purposes any values received from the temperature sensor after the receipt of a sensor value outside of the first range of values during the first time interval.

18. The method of claim 15, wherein the initial operation of the expansion valve corresponds to the initial freezing of the product in the chamber.

19. The method of claim 15, wherein the initial operation of the expansion valve corresponds to a refreeze of the product in the chamber.

* * * * *